(12) United States Patent
Lin et al.

(10) Patent No.: US 9,058,451 B2
(45) Date of Patent: Jun. 16, 2015

(54) AUTOMATIC SYNTHESIS OF COMPLEX CLOCK SYSTEMS

(71) Applicant: Synopsys, Inc., Mountain View, CA (US)

(72) Inventors: Tao Lin, Palo Alto, CA (US); Jieyi Long, San Jose, CA (US); Anand Rajaram, Austin, TX (US); Michael Bezman, Sunnyvale, CA (US)

(73) Assignee: Synopsys, Inc., Mountain View, CA (US)

( * ) Notice: Subject to any disclaimer, the term of this patent is extended or adjusted under 35 U.S.C. 154(b) by 0 days.

(21) Appl. No.: 14/012,950

(22) Filed: Aug. 28, 2013

(65) Prior Publication Data
US 2014/0258964 A1    Sep. 11, 2014

Related U.S. Application Data

(60) Provisional application No. 61/773,108, filed on Mar. 5, 2013.

(51) Int. Cl.
*G06F 17/50* (2006.01)
(52) U.S. Cl.
CPC .......... *G06F 17/505* (2013.01); *G06F 2217/06* (2013.01); *G06F 2217/62* (2013.01)
(58) Field of Classification Search
USPC .......... 716/100, 104–108, 113, 122, 132, 134
See application file for complete search history.

(56) References Cited

U.S. PATENT DOCUMENTS

| 5,555,188 | A  | * | 9/1996 | Chakradhar | 716/108 |
| 2012/0005642 | A1 | * | 1/2012 | Ispir et al. | 716/113 |

OTHER PUBLICATIONS

"The Automated Synthesis of High Performance Clock Distribution Networks," Proceedings of the IEEE International Workshop on Clock Distribution Networks Design, Synthesis, and Analysis, pp. 11-12, Oct. 1997.*
"A graph-theoretic approach to clock skew optimization", 1994. ISCAS '94, 1994 IEEE International Symposium, 4 pages.*
X. Liu, M. C. Papaefthymiou, and E. G. Friedman, "Maximizing Performance by Retiming and Clock Skew Scheduling," Proceedings of the IEEE/ACM Design Automation Conference, 6 pages, Jun. 1999.*
Clock-Tree Routing Realizing a Clock-Schedule for Semi-Synchronous Circuits, IEEE/ACM International Conference on Computer Aided Design 97, pp. 260-265.*

* cited by examiner

*Primary Examiner* — Paul Dinh
(74) *Attorney, Agent, or Firm* — HIPLegal LLP

(57) ABSTRACT

A global optimization method to synthesize and balance the clock systems in a multimode, multi-corner, and multi-domain design environment is described. The method builds a graph representation for a clock network. The method determines an optimal clock network balancing solution for the clock network by applying linear programming to the graph. To apply linear programming to the graph, the method generates a set of constraints for the graph and determines a proper insertion delay for each edge of the graph by solving for a minimal skew based on the set of constraints. The method implements the optimal clock network balancing solution.

22 Claims, 17 Drawing Sheets

AUTOMATIC SYNTHESIS OF COMPLEX CLOCK SYSTEMS

RELATED APPLICATION

The present application claims priority to U.S. Provisional Application 61/773,108 filed on Mar. 5, 2013, and incorporates that application in its entirety by reference.

FIELD

The present invention relates to electronic design automation and in particular to clock tree synthesis (CTS) in electronic design automation.

BACKGROUND

Advances in semiconductor technology presently make it possible to integrate large-scale systems, including hundreds of millions of transistors, onto a single semiconductor chip. Integrating such large-scale systems onto a single semiconductor chip increases the speed at which such systems can operate, because signals between system components do not have to cross chip boundaries, and are not subject to lengthy chip-to-chip propagation delays.

The speed of a system on an integrated circuit (IC) chip is largely determined by system clock frequency. In a typical synchronous IC chip, a clock distribution network is used to distribute a clock signal from a common source to various circuit components. This clock signal is used to coordinate data transfers between circuit components. The arrival of clock signal at the sequential components (typically registers or latches) triggers the launching and the capturing of the digital signal before and after logical computation. As increasing clock frequencies reduce the clock periods to fractions of a nanosecond, designing clock distribution networks is becoming increasingly more challenging. A direct result of the decreasing clock period is a shrinking "timing budget" between logically coupled clock sinks. This decreasing timing budget requires clock networks to be implemented with precision so that the skew of the clock arrival times at sequential components is minimized.

The primary goal of clock network synthesis is to minimize skew. In addition, the total insertion delay and clock buffer delay and power consumption are important metrics of quality. Traditionally, clock network synthesis tools employ greedy algorithm based local optimization methods to balance the skew across the clock sinks. These conventional tools primarily address clock networks with tree like topology. Therefore clock network synthesis is commonly referred to as clock tree synthesis. With these conventional tools, complex clock systems are divided into tree-like partitions based on heuristics that simplifies the conditions of how the clock network operates. These tools typically involve a top down or bottom up traversal of the clock network. During the traversal, these tools will try to decide whether it is possible to insert a buffer or a pair of inverters to each edge when the edge is traversed. These traditional methods tend to insert as many buffers as early as possible based entirely on local information. They are not aware of potential conflicts between different clocks in different timing mode. They are not able to handle the delay differences among a large number of corners. They are not aware of the physical context of the clock network such as floorplan limitations, congestions, and routability.

The existing clock tree synthesis methods require a lot of human intervention. They require the users to define and partition the clock system so that the tools can handle it properly. The existing clock tree synthesis methods do not know whether a target skew is achievable until the clock network is fully synthesized, placed, and routed. When the target skew is not achieved, these tools will not be able to determine whether it is due to a design mistake or a tool limitation. Even if the skew target is achieved on a block level, when the IC blocks are assembled at the top level, they often cannot be balanced and the only remedy is to open up some of the blocks and redesign their clock systems. Furthermore, known clock skew balancing tools produce unroutable or infeasible skew balancing solutions, especially for designs with complex floorplans and narrow channels.

BRIEF DESCRIPTION OF THE FIGURES

The present invention is illustrated by way of example, and not by way of limitation, in the figures of the accompanying drawings and in which like reference numerals refer to similar elements and in which.

DETAILED DESCRIPTION

In some embodiments, the present invention is a global optimization method to synthesize and balance the clock systems in a multimode, multi-corner, and multi-domain design environment. In some embodiments, the method optimizes for multiple objective functions, including but not limited to clock insertion delay, clock area or power, and cell or wire congestion. The method of some embodiments is a fully automated process that requires little or no intervention from the users. The method in one embodiment achieves the global optimality of the solution mathematically. Before the clock solution is placed and routed, the method of some embodiments predicts the best skew and insertion delay achievable and points the users to conflicts in the design of the clock systems, so that these conflicts can be addressed early in the design cycle. Furthermore, some embodiments of this method consider physical context of the design during clock network synthesis to create less congested, routable clock systems.

The method of some embodiments uses mathematical programming to solve for globally optimal solutions for multimode designs. In some embodiments, the method uses mathematical programming to solve for globally optimal solutions for multi-corner designs. The method of some embodiments uses mathematical programming to solve for globally optimal solutions for multi-domain/floorplan designs. In some embodiments, the method automatically determines the optimal target skew/latency. The method of some embodiments determines the optimal implementation of multi-corner delay. In some embodiments, the method uses router or congestion information to guide clock network synthesis buffer placement and wire insertion to maximize routability.

The following detailed description of embodiments of the invention makes reference to the accompanying drawings in which like references indicate similar elements, showing by way of illustration specific embodiments of practicing the invention. Description of these embodiments is in sufficient detail to enable those skilled in the art to practice the invention. One skilled in the art understands that other embodiments may be utilized and that logical, mechanical, electrical, functional and other changes may be made without departing from the scope of the present invention. The following detailed description is, therefore, not to be taken in a limiting sense, and the scope of the present invention is defined only by the appended claims.

Figure 1:
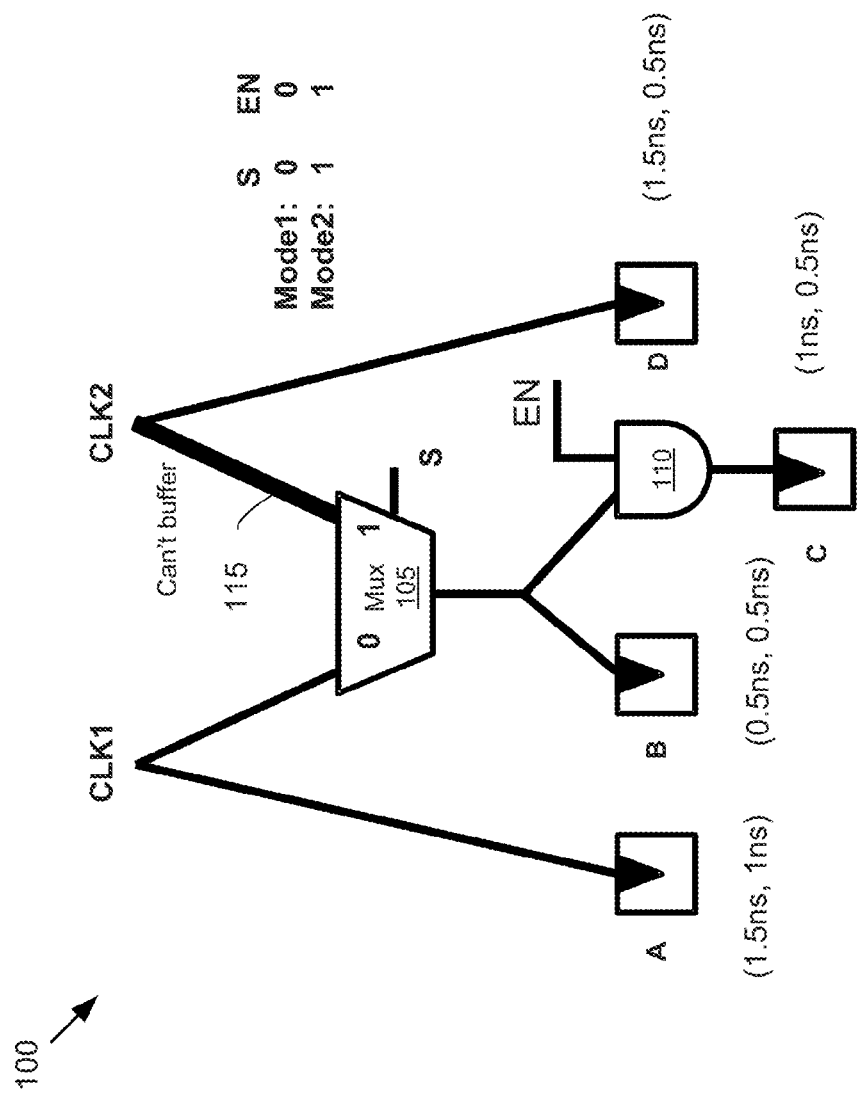
FIG. 1 illustrates an example of the problems existing in traditional clock tree synthesis tools.

FIG. 1 illustrates an example of the problems existing in traditional clock tree synthesis tools. As illustrated in this figure, a circuit 100 has two clocks CLK1 and CLK2 coming to four flip-flops A, B, C, and D through a multiplexer 105 and a clock gater 110.

The circuit 100 operates in two modes: mode 1 and mode 2. In mode 1, the select signal S of the multiplexer 105 and the enable signal EN of the clock gater 110 are both "0." Therefore CLK1 is selected by the multiplexer 105 and reaches flip-flop B, while reaching flip-flop A directly. In mode 2, the select signal S and the enable signal EN are both "1". Therefore CLK2 will be selected by the multiplexer 105 and the clock gater 110 will allow the clock signal to propagate to flip-flops B and C, while reaching flip-flop D directly. To synthesize this simple clock circuit properly, the clock arrival time at the flip-flops A and B must be balanced in mode 1; and the clock arrival time at the flip-flops B, C, and D must be balanced in mode 2.

When edge 115 coming in the multiplexer 105 from the clock source CLK2 cannot be buffered due to a special floorplan limitation, skew balancing becomes difficult. Furthermore, the circuit described above should work in two process corners X and Y. The delays of the existing circuits are annotated as pairs of arrival times at the clock pin of each flip-flop, e.g., (1.5 ns, 1 ns), (0.5 ns, 0.5 ns), (1 ns, 0.5 ns), and (1.5 ns, 0.5 ns). The first arrival time of each pair represents the arrival time for corner X. The second arrival time of each pair represents the arrival time for corner Y.

For corner X, in order to balance the sinks of A and B, the traditional methods insert 1 ns delay between the clock source CLK1 and the input of multiplexer 105, so that the clock arrival time of the sinks of A and B would both be 1.5 ns. Note that the sinks of B, C, and D also need to be balanced in mode 2. In order to achieve that, a delay of 0.5 ns needs to be inserted between the output of multiplexer 105 and the sink of C, a delay of 1 ns needs to be inserted between the output of multiplexer 105 and the sink of B. However as a result of balancing the sinks of B, C, D in mode 2, the sinks of A and B in mode 1 will become imbalanced. (Sink of A has an arrival time of 1.5 ns, while sink of B now has an arrival time 2 ns). Therefore sink of A will have to get an additional delay of 0.5 ns so that both sinks will have clock arriving at 2 ns. This balance often is not achievable with traditional CTS tools, and requires skilled user input. Even when the balance is achieved, the results are not optimal. The optimal solution of this single corner problem is to insert 1 ns delay between the output of multiplexer 105 and clock sink B and 0.5 ns delay between the output of multiplexer 105 and clock sink C, without inserting any delay between the clock source CLK1 and the input of multiplexer 105.

When both corners X and Y are to be optimized, the problem becomes significantly more complicated because inserting an amount of delay in corner X, will result in a certain amount of delay in corner Y. This amount of delay, though it typically falls into a range of ratios of the delay in corner X, is not exactly proportional to the corner X delay by a constant factor for sinks A, B, C, and D. Considering the circuit 100 and the number pairs described above, note that the CTS tool cannot simply insert 1 ns delay for the sink of B, and 0.5 ns delay for the sink of C in corner X because this most likely will increase the delay of sinks B and C in corner Y. This means that their arrival time in corner Y will definitely be out of balance compared to the corner Y arrival time of 0.5 ns at the sink of D. With traditional clock tree synthesis methods, tedious user interference is required to fix such problems in trial and error fashion. Yet the designers often have to accept suboptimal solutions as a result, in the absence of an apparatus to calculate and implement an optimal solution.

Figure 2:
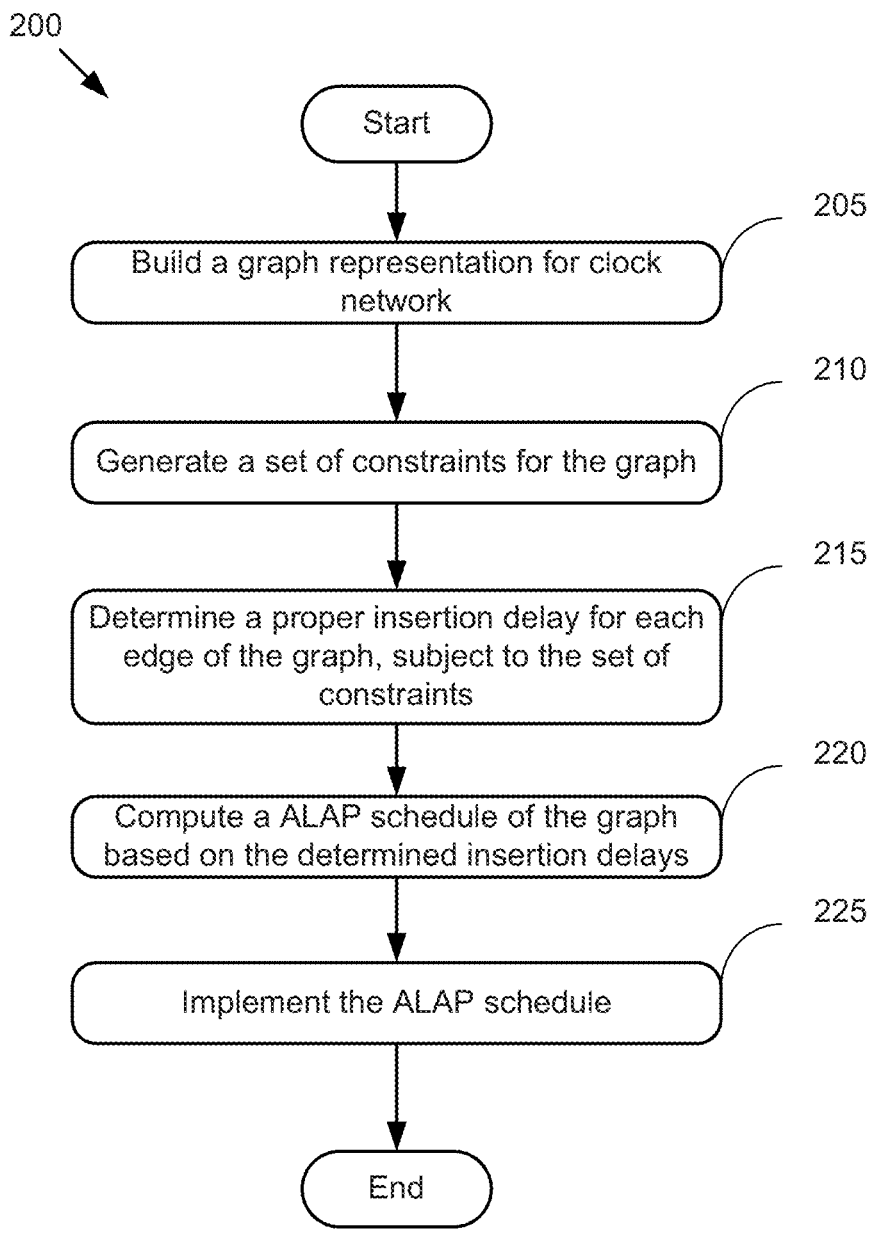
FIG. 2 is a flowchart of one embodiment of using a clock network synthesis tool in accordance with the present invention.

FIG. 2 is a flowchart of one embodiment of using a clock network synthesis tool in accordance with the present invention. Specifically, this figure describes a process 200 that uses mathematical programming to solve for globally optimal solutions for multimode, multi-corner, multi-domain circuit designs. In some embodiments, the process 200 starts after a clock network synthesis tool receives a clock network for skew balancing. As shown in the figure, the process 200 begins by building (at block 205) a graph representation for the clock network. In some embodiments, the graph representation is a directional graph that includes nodes and edges. Each node represents a flip-flop or another clock-driven circuit component. Each edge represents the delay between the two nodes connected by the edge.

At block 210, the process 200 generates a set of constraints for the graph representation of the clock network. The process then determines (at block 215) the proper insertion delay for each edge of the graph in order to achieve the optimal value of the objective function, subject to the set of constraints. Specifically, the process uses mathematical programming to solve for the proper insertion delay for each edge based on the set of constraints. Mathematical programming, or mathematical optimization, is the selection of a best element (with regard to some criteria) from some set of available alternatives. Convex programming is one kind of mathematical programming that studies the case when the objective function is convex (minimization) or concave (maximization) and the constraint set is convex. This can be viewed as a particular case of nonlinear programming or as generalization of linear or convex quadratic programming. An important characteristic of convex programming is that the local optimum of a convex programming problem must be the global optimum. Therefore, convex programming guarantees the achievement of globally optimal solutions.

Linear programming (LP) is a type of convex programming that studies the case in which the objective function $f$ is linear and the set of constraints is specified using only linear equalities and inequalities. Examples and embodiments of the mathematical programming are discussed in more detail below.

Next, the process 200 computes (at block 220) an as-late-as-possible (ALAP) schedule for each node of the graph representation of the clock network based on the determined insertion delays. An ALAP schedule achieves an optimal edge by edge delay budget that minimizes total clock area by maximizing sum of arrival times at all nodes. An ALAP schedule essentially pushes the buffers to upstream nodes, thus maximizing sharing. One embodiment of transformation to the ALAP schedule is described below in reference to FIG. 4.

At block 225, the process 200 implements the ALAP schedule for the insertion delays. In some embodiments, the ALAP schedule is implemented in a top-down order. The delay implementation tries to achieve the target latency of each node as closely as possible, but never exceeds the target latency. The process 200 then ends.

One of ordinary skill in the art will recognize that the process 200 is a conceptual representation of the operations used to perform clock network synthesis. The specific operations of the process 200 may not be performed in the exact order shown and described. The specific operations may not be performed in one continuous series of operations, and different specific operations may be performed in different embodiments. Furthermore, the process could be implemented using several sub-processes, or as part of a larger macro process. For instance, in some embodiments, the process 200 is performed by one or more software applications that execute on one or more computers. One of ordinary skill in the art will also recognize that the methods and apparatus described herein apply to all circuits of an IC in some embodiments, while only apply to a selected portion of the IC in other embodiments.

Several more detailed embodiments of the clock network synthesis tool in accordance with the present invention are described in the sections below. Section I describes budgeting insertion delay for multimode, multi-corner, multi-domain circuit designs in some embodiments. Section II describes implementing insertion delays for multimode, multi-corner, multi-domain circuit designs in some embodiments. Section III describes system components of the clock network synthesis tool in some embodiments. Section IV describes embodiments of a clock network synthesis tool in accordance with the present invention. Finally, Section V describes a digital processing system that can be used with some embodiments of the invention.

I. Budgeting Insertion Delay

A two-phase process for clock network synthesis is described, in one embodiment. The first phase is "budgeting," which identifies an optimal clock network balancing solution. The second phase, "implementation," which implements the identified optimal clock network balancing solution, is described below in Section II. During the budgeting phase, the clock network synthesis tool, in some embodiments, formulates the design objectives and design constraints as a series of mathematic programming problems. By solving these mathematic programming problems, the clock network synthesis tool obtains a reasonable, practical goal for the clock system based on the user constraints. By reviewing the solutions of the mathematic programming problems, the user can check whether the design constraints are set properly and whether their expectations can be met mathematically. Furthermore, by solving these mathematical programming problems, the clock network synthesis tool generates an optimal set of target delays to be implemented at the next phase.

A mode is a specific status or a set of designed behaviors of a given integrated circuit under certain conditions. An IC may operate in different modes such as working, testing, hibernating, or resetting. In different modes, different parts of the integrated circuit remain active. The clock system may be turned off in different parts of the design, or clocks with a different frequency may be passed to different parts of the chip. Nowadays, most ICs will operate in multiple modes. Therefore, the design process considers all modes, in one embodiment. During the design process, each mode is represented as a set of timing constraints (clock definitions, required times, etc.). To design the clock systems properly, the design process considers the timing constraints from all modes at the same time.

Figure 3:
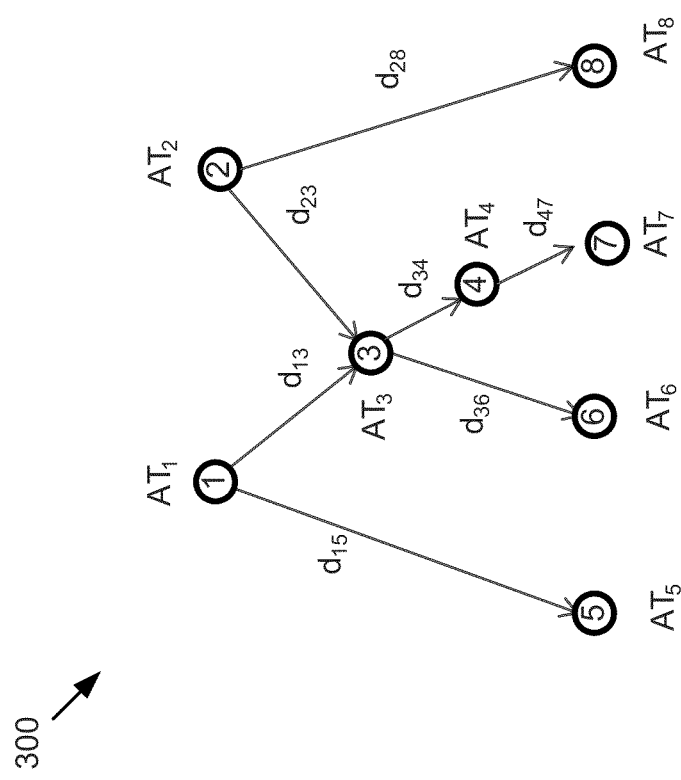
FIG. 3 illustrates an example of using mathematical programming to solve for a globally optimal solution for a multimode design.

FIG. 3 illustrates an example of using mathematical programming to solve for a globally optimal solution for a multimode design. As illustrated in this figure, a graph 300 has eight nodes 1-8. For a node i, there is a clock arrival time represented by $AT_i$. Each edge of the graph 300 has an associated insertion delay $d_{ij}$ (i.e., the extra delay that needs to be added between nodes i and j) for all modes and all phases.

By using linear programming, the problem of finding the minimal achievable skew of the clock network shown in graph 300 can be expressed as:

Minimize: $skew_{max}$

Subject to:

$AT_{\theta,j} = AT_{\theta,i} + C_{ij} + d_{ij}$ (Edge relation)

$l_{sg} \leq AT_{\theta,k} - offset_{\theta,k} \leq L_{sg}$ (Endpoint constraint)

$L_{sg} - l_{sg} \leq skew_{sg}$ (Skew limit)

$L_{sg} \leq L_{max}$ (Maximum latency constraint)

$skew_{sg} \leq skew_{max}$ (Maximum skew constraint)

where $skew_{max}$ is the maximum skew for the clock network, $AT_{\theta,i}$ represents the clock arrival time of node i at clock phase $\theta$, $C_{ij}$ represents the existing delay between nodes i and j, $l_{sg}$ is the minimum latency of a skew group sg (i.e., a group of clock phases that need to perform skew balancing), the minimum latency of a skew group is essentially the minimum offsetted arrival time among all sink nodes, $L_{sg}$ is the maximum latency of the skew group sg, which is essentially the maximum offsetted arrival time among all sink nodes, offset$_{\theta,k}$ is a user defined constant offset value for sink node k at clock phase θ, skew$_{sg}$ is a user defined skew limit for latency of the skew group sg, L$_{max}$ is the maximum latency for the entire clock network.

The objective of this linear programming problem is to determine the proper insertion delay for each edge of the graph 300 in order to minimize the maximum skew for the graph. The linear programming problem is subject to a set of constraints. The edge relation constraint AT$_{\theta,j}$=AT$_{\theta,i}$+C$_{ij}$+d$_{ij}$ represents that the arrival time of a child node at a clock phase is equal to the sum of the arrival time of its parent node at the clock phase, the exiting delay between the parent and child node pair, and the insertion delay between the pair of nodes. For example, the arrival time for node 6 equals the arrival time for node 3, plus the existing delay, plus insertion delay between nodes 6 and 3.

The endpoint constraint l$_{sg}$≤AT$_{\theta,k}$−offset$_{\theta,k}$≤L$_{sg}$ specifies that the arrival time at a sink node minus a user defined offset value for the sink node should stay between the minimum latency and the maximum latency of a skew group. For example, the arrival time at node 5 minus the user defined offset value for node 5 should stay between the minimum latency and the maximum latency of the skew group.

The skew limit constraint L$_{sg}$−l$_{sg}$≤skew$_{sg}$ specifies that the difference between the maximum latency and the minimum latency of the skew group should be less than or equal to a user defined skew limit for the skew group. The maximum latency constraint L$_{sg}$≤L$_{max}$ specifies that the maximum latency of each skew group should be less than or equal to the maximum latency for the entire clock network. The maximum skew constraint skew$_{sg}$≤skew$_{max}$ specifies that the user defined skew limit for each skew group should be less than or equal to the maximum skew for the entire clock network. By solving this linear programming problem with these constraints, the clock network synthesis tool is able to determine the minimum insertion delay for each edge of the graph 300.

Once the minimum insertion delay for each edge is determined, the clock network synthesis tool of some embodiments transforms the solution to an ALAP schedule for each node of the graph representing the clock network.

Figure 4:
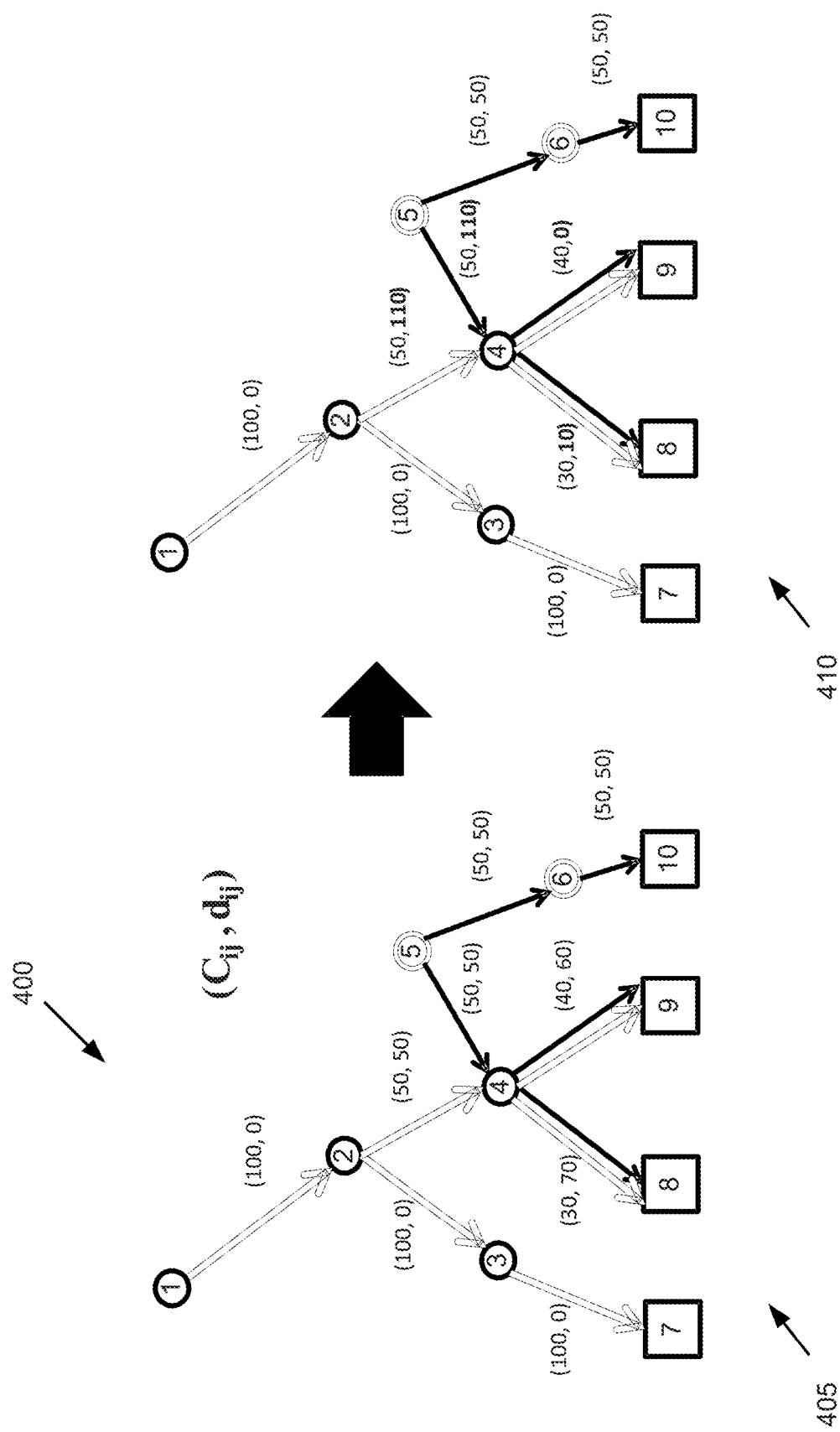
FIG. 4 illustrates an example of transforming an insertion delay solution into an as-late-as-possible (ALAP) schedule.

FIG. 4 illustrates an example of transforming the insertion delay solution into an ALAP schedule. The transformation is illustrated in two stages 405 and 410. The clock network 400 includes 10 nodes 1-10, among which nodes 7-10 are sink nodes. Each edge of the clock network is associated with a pair of values, the first value being the existing delay on the edge and the second value being the determined insertion delay on the edge. For example, the existing delay between nodes 1 and 2 is 100 ns and the insertion delay between them is 0 ns.

In the first stage 405, the insertion delay between nodes 4 and 8 is 70 ns and the insertion delay between nodes 4 and 9 is 60 ns. Since there are 60 ns of common insertion delay that need to be implemented for each child of node 4, this common insertion delay can be pushed to upstream edges without introducing any extra delay leading to sink nodes 8 and 9. Therefore, in the second stage 410, the common insertion delay of 60 ns has been pushed up to the edge between nodes 2 and 4 and the edge between nodes 5 and 4. As a result, the insertion delay between nodes 4 and 8 becomes 10 ns, the insertion delay between nodes 4 and 9 becomes 0 ns, the insertion delay between nodes 2 and 4 becomes 110 ns, and the insertion delay between nodes 5 and 4 becomes 110 ns.

In an ALAP schedule, each node should be "tight", meaning any amount of postponing of any node would violate at least one of the constraints described above for solving the optimal insertion delay. By pushing the insertion delays upstream, this method reduces the overall number of buffers and/or wires that need to be inserted as delay.

Integrated circuits are typically fabricated with variations due to process corners. A process corner is an example of a design-of-experiments (DoE) technique that refers to a variation of fabrication parameters used in applying an integrated circuit design to a semiconductor wafer. Process corners represent the extremes of these parameter variations within which a circuit that has been etched onto the wafer must function correctly. ICs may also operate in varying environments such as varying temperatures and various supply voltages. The process variations and the varying environment affect the responding speed of the circuit. The different combinations of process corners and environment variations are modeled as sets of parameters that are called corners. A multi-corner design is an integrated circuit design that involves multiple corners.

Figure 5:
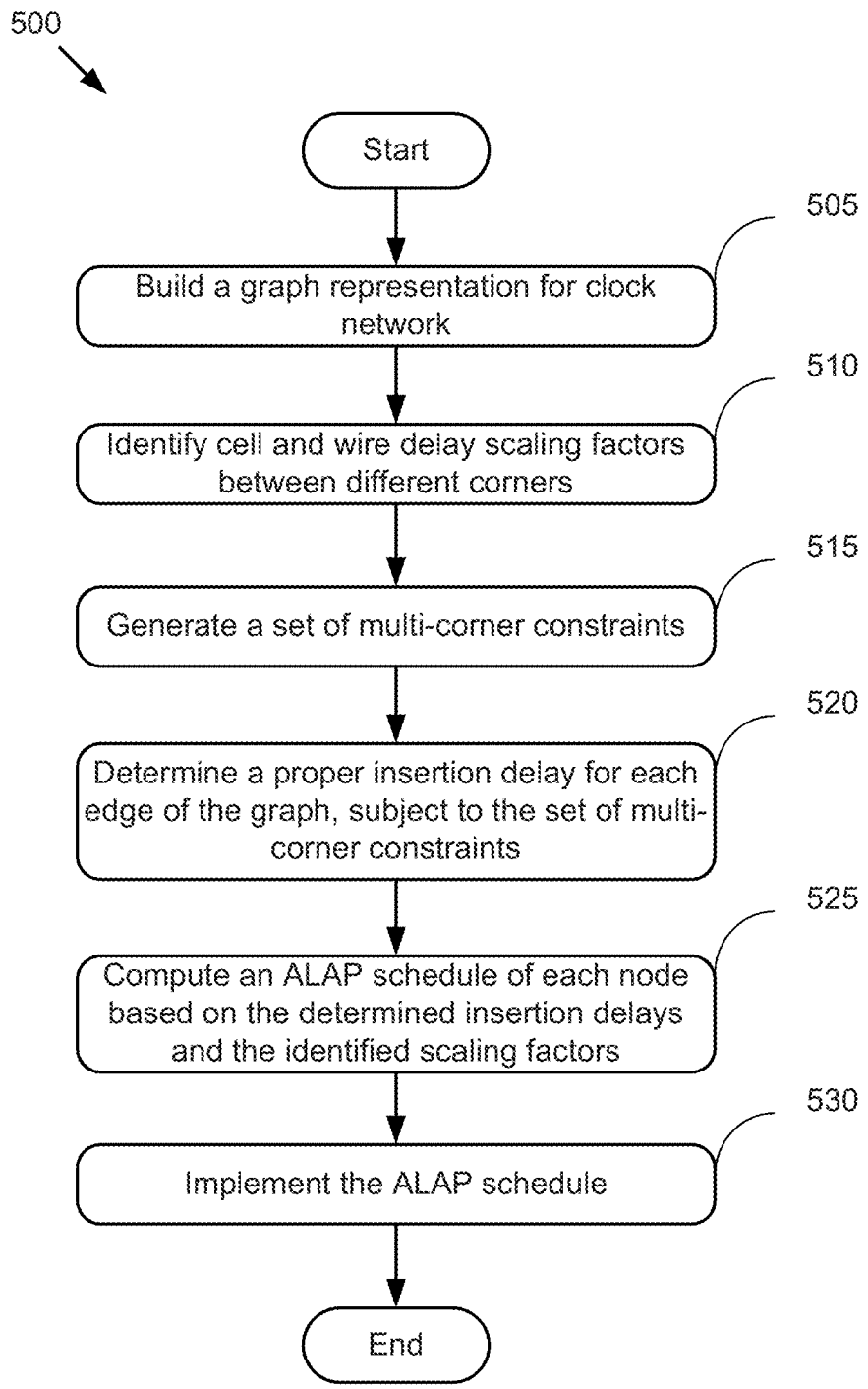
FIG. 5 illustrates a flowchart of one embodiment of using a clock network synthesis tool to handle multi-corner designs in accordance with the present invention.

FIG. 5 illustrates a flowchart of one embodiment of using a clock network synthesis tool to handle multi-corner designs in accordance with the present invention. Specifically, this figure describes a process 500 that uses mathematical programming to solve for a globally optimal solution for a multi-corner design. In some embodiments, the process 500 starts after a clock network synthesis tool receives a clock network for skew balancing. As shown in the figure, the process 500 begins by building (at block 505) a graph representation for the clock network. In some embodiments, the graph representation is a directional graph that includes nodes and edges. Each node represents a flip-flop or another clock-driven circuit component. Each edge represents the delay between the two nodes connected by the edge.

At block 510, the process 500 identifies cell and wire delay scaling factors between different corners. When a cell or wire delay of a certain amount of time is inserted in one corner, it will introduce a different amount of delay time in another corner. Therefore, the ratio between cell delays at two different corners is defined as the cell delay scaling factor for these two corners. Similarly, the ratio between wire delays at two different corners is defined as the wire delay scaling factor for these two corners. One embodiment of calculating cell and wire delay scaling factors is described below in reference to FIG. 7.

Next, the process 500 generates (at block 515) a set of multi-corner constraints for the graph representation of the clock network. The process then determines (at block 520) the proper insertion delay for each edge of the graph in order to achieve the optimal value of the objective function, subject to the set of multi-corner constraints. For each edge, an insertion delay is the sum of cell insertion delay and wire insertion delay. In some embodiments, the process 500 uses mathematical programming to solve for the proper insertion delay for each edge based on the set of multi-corner constraints.

For example, by using linear programming, the problem of finding the minimal achievable skew of the clock network can be expressed as:

Minimize: skew$_{max}$

Subject to:

| | |
|---|---:|
| $AT_{c,\theta,j}=AT_{c,\theta,i}+C_{c,ij}+d_{c,ij}^{cell}+d_{c,ij}^{wire}$ | (Edge relation) |
| $l_{c,sg} \leq AT_{c,\theta,k}-\text{offset}_{c,\theta,k} \leq L_{c,sg}$ | (Endpoint constraint) |
| $L_{c,sg}-l_{c,sg} \leq \text{skew}_{c,sg}$ | (Skew limit) |
| $L_{c,sg} \leq L_{max}$ | (Maximum latency constraint) |
| $\text{skew}_{c,sg} \leq \text{skew}_{max}$ | (Maximum skew constraint) |

$\alpha_{c,r} d_{r,ij}^{cell} \leq d_{c,ij}^{cell} \leq A_{c,r} d_{r,ij}^{cell}$ (Cell corner scaling constraint)

$\beta_{c,r} d_{r,ij}^{wire} \leq d_{c,ij}^{wire} \leq B_{c,r} d_{r,ij}^{wire}$ (Wire corner scaling constraint)

where
skew$_{max}$ is the maximum skew for the clock network,
AT$_{c,\theta,i}$ is the clock arrival time of node i at clock phase θ of corner c,
C$_{c,ij}$ is the existing delay between nodes i and j at corner c,
d$_{c,ij}^{cell}$ is the cell insertion delay between nodes i and j at corner c,
d$_{c,ij}^{wire}$ is the wire insertion delay between nodes i and j at corner c,
l$_{c,sg}$ is the minimum latency for skew group sg and corner c, which is essentially the minimum offsetted arrival time among all sink nodes for skew group sg and corner c,
L$_{c,sg}$ is the maximum latency for skew group sg and corner c, which is essentially the maximum offsetted arrival time among all sink nodes for skew group sg and corner c,
offset$_{c,\theta,k}$ is a user defined constant offset value for sink node k at clock phase θ of corner c,
skew$_{c,sg}$ is a user defined skew limit for skew group sg and corner c,
L$_{max}$ is the maximum latency for the entire clock network,
$\alpha_{c,r}$ represents the minimum cell delay scaling factor between two corners c and r,
A$_{c,r}$ represents the maximum cell delay scaling factor between two corners c and r,
$\beta_{c,r}$ represents the minimum wire delay scaling factor between two corners c and r,
B$_{c,r}$ represents the maximum wire delay scaling factor between two corners c and r.

The objective of this linear programming problem is to determine the proper cell and wire insertion delay for each edge of the graph in order to minimize the maximum skew for the graph. The linear programming problem is subject to a set of multi-corner constraints. The edge relation constraint AT$_{c,\theta,j}$=AT$_{c,\theta,i}$+C$_{c,ij}$+d$_{c,ij}^{cell}$+d$_{c,ij}^{wire}$ represents that the arrival time of a child node at a clock phase of a corner is equal to the sum of the arrival time of its parent node at the same clock phase of the corner, the exiting delay between this parent child node pair at the same corner, and the cell and wire insertion delays between the pair of nodes at the same corner.

The endpoint constraint l$_{c,sg}$≤AT$_{c,\theta,k}$−offset$_{c,\theta,k}$≤L$_{c,sg}$ specifies that the arrival time at a sink node at a corner, minus a user defined offset value for the sink node at the same corner, should stay between the minimum latency and the maximum latency for the skew group and the corner. The skew limit constraint L$_{c,sg}$−l$_{c,sg}$≤skew$_{c,sg}$ specifies that the difference between the maximum latency and the minimum latency for a skew group and a corner should be less than or equal to a user defined skew limit for the skew group and the corner. The maximum latency constraint L$_{c,sg}$≤L$_{max}$ specifies that the maximum latency for each skew group and each corner should be less than or equal to the maximum latency for the entire clock network. The maximum skew constraint skew$_{c,sg}$≤skew$_{max}$ specifies that the user defined skew limit for each skew group and each corner should be less than or equal to the maximum skew for the entire clock network.

The cell corner scaling constraint $\alpha_{c,r} d_{r,ij}^{cell} \leq d_{c,ij}^{cell} \leq A_{c,r} d_{r,ij}^{cell}$ specifies that the cell insertion delay for an edge at a corner should be greater than or equal to the cell insertion delay for the same edge at a reference corner multiplied by the minimum cell delay scaling factor between the two corners, while less than or equal to the cell insertion delay for the same edge at the reference corner multiplied by the maximum cell delay scaling factor between the two corners. The cell corner scaling constraint $\beta_{c,r} d_{r,ij}^{wire} \leq d_{c,ij}^{wire} \leq B_{c,r} d_{r,ij}^{wire}$ specifies that the wire insertion delay for an edge at a corner should be greater than or equal to the wire insertion delay for the same edge at a reference corner multiplied by the minimum wire delay scaling factor between the two corners, while less than or equal to the wire insertion delay for the same edge at the reference corner multiplied by the maximum wire delay scaling factor between the two corners. By solving this linear programming problem with these multi-corner constraints, the clock network synthesis tool is able to determine the minimum cell and wire insertion delays for each edge of the graph.

At block 525, the process 500 computes an ALAP schedule for each node of the graph representation of the clock network based on the determined insertion delays and the identified scaling factors. One embodiment of transformation to the ALAP schedule is described below in reference to FIG. 6.

At block 530, the process 500 implements the ALAP schedule for the insertion delays. In some embodiments, the ALAP schedule is implemented in a top-down order. The delay implementation tries to achieve the target latency of each node as closely as possible, but never exceeds the target latency. The process 500 then terminates.

One of ordinary skill in the art will recognize that the process 500 is a conceptual representation of the operations used to perform clock network synthesis. The specific operations of the process 500 may not be performed in the exact order shown and described. The specific operations may not be performed in one continuous series of operations, and different specific operations may be performed in different embodiments. Furthermore, the process could be implemented using several sub-processes, or as part of a larger macro process. For instance, in some embodiments, the process 500 is performed by one or more software applications that execute on one or more computers.

Figure 6:
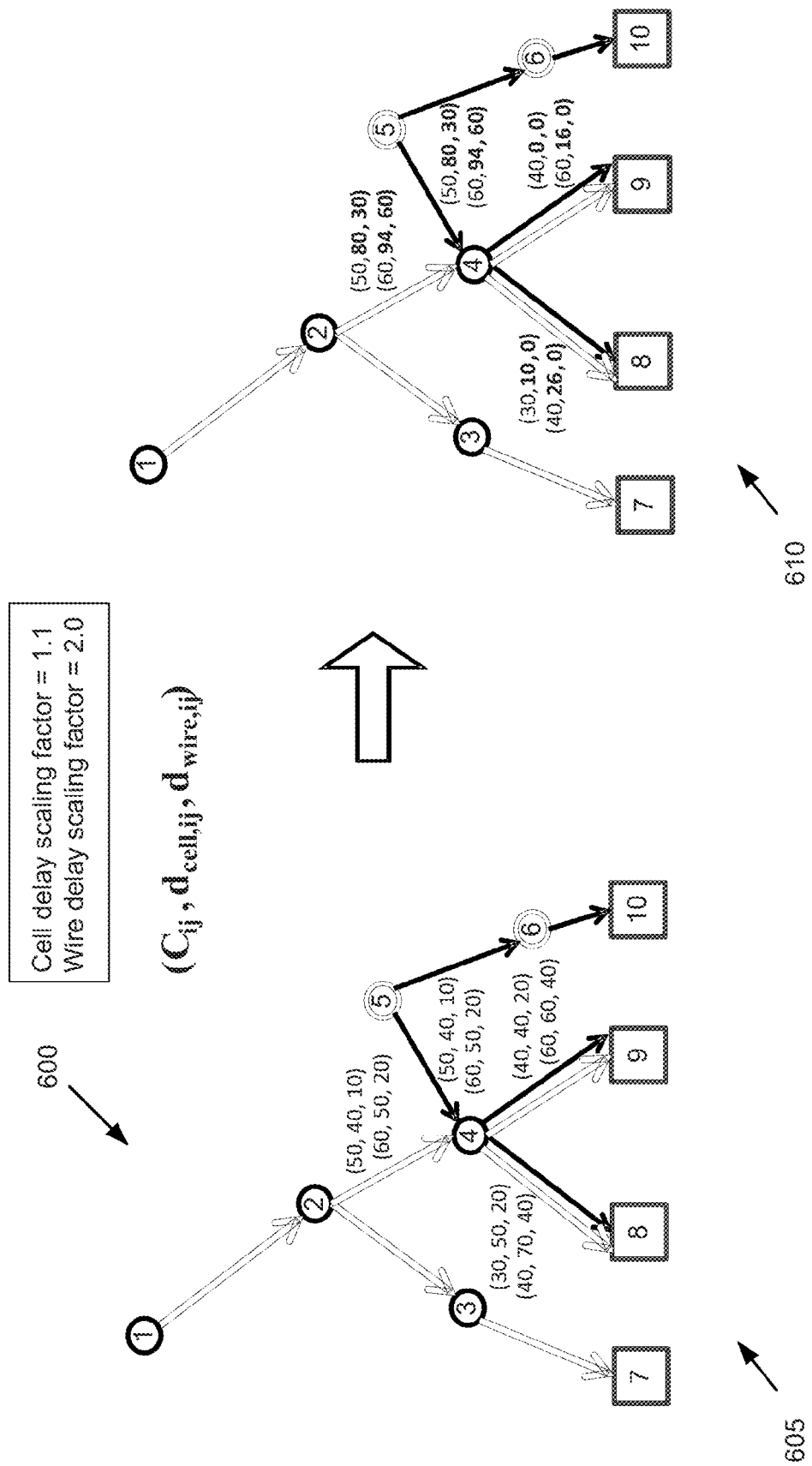
FIG. 6 illustrates an example of transforming a cell and wire insertion delay solution for multiple corners into an ALAP schedule.

Once the minimum cell and wire insertion delays for each edge is determined, the clock network synthesis tool of some embodiments transforms the solution to an ALAP schedule for each node of the graph representing the clock network. FIG. 6 illustrates an example of transforming the cell and wire insertion delay solution for multiple corners into an ALAP schedule. The transformation is illustrated in two stages 605 and 610. The clock network 600 includes 10 nodes 1-10, among which nodes 7-10 are sink nodes.

Each edge of the clock network is associated with two sets of values, each set of values representing a corner. The first value in a set represents the existing delay on the edge. The second value in a set represents the determined cell insertion delay on the edge. The third value in a set represents the determined wire insertion delay on the edge. For example, for a first corner, the existing delay between nodes 2 and 4 is 50 ns, the cell insertion delay between them is 40 ns, and the wire insertion delay between them is 10 ns. For a reference corner, the existing delay between nodes 2 and 4 is 60 ns, the cell insertion delay between them is 50 ns, and the wire insertion delay between them is 20 ns.

In the first stage 605, for the first corner, the cell and wire insertion delays between nodes 4 and 8 are 50 ns and 20 ns, respectively. And the cell and wire insertion delays between nodes 4 and 9 are 40 ns and 20 ns, respectively. Since there are 40 ns of common cell insertion delay and 20 ns of common wire insertion delay that need to be implemented for each child of node 4, these common insertion delays can be pushed to upstream edges without introducing any extra delay leading to sink nodes 8 and 9.

In the second stage 610, the common cell insertion delay of 40 ns and the common wire insertion delay of 20 ns of the first corner have been pushed up to the edge between nodes 2 and 4 and the edge between nodes 5 and 4. As a result, for the first corner, the cell and wire insertion delays between nodes 4 and 8 become 10 ns and 0 ns, respectively, the cell and wire insertion delays between nodes 4 and 9 both become 0 ns, the cell and wire insertion delays between nodes 2 and 4 become 80 ns and 30 ns, respectively, and the cell and wire insertion delays between nodes 5 and 4 become 80 ns and 30 ns, respectively.

The cell and wire insertion delays in the reference corner are adjusted accordingly. Since the cell delay scaling factor is 1.1 and the cell insertion delay is pushed up for 40 ns in the first corner, the cell insertion delay is pushed up 44 ns (40 ns×1.1) in the reference corner. Similarly, since the wire delay scaling factor is 2.0 and the wire insertion delay is pushed up for 20 ns in the first corner, the wire insertion delay is pushed up 40 ns (20 ns×2.0) in the reference corner. As a result, for the reference corner, the cell and wire insertion delays between nodes 4 and 8 become 26 ns and 0 ns, respectively, the cell and wire insertion delays between nodes 4 and 9 become 16 ns and 0 ns, respectively, the cell and wire insertion delays between nodes 2 and 4 become 94 ns and 60 ns, respectively, and the cell and wire insertion delays between nodes 5 and 4 become 94 ns and 60 ns, respectively.

In a multi-corner ALAP schedule, cell insertion delay and wire insertion delay are pushed up separately. The cell and wire scaling factors need to be maintained across corners. By pushing the cell and wire insertion delays upstream, this method reduces the overall number of cells and wires that need to be inserted as delay while maintaining clock skews of each corner.

Figure 7:
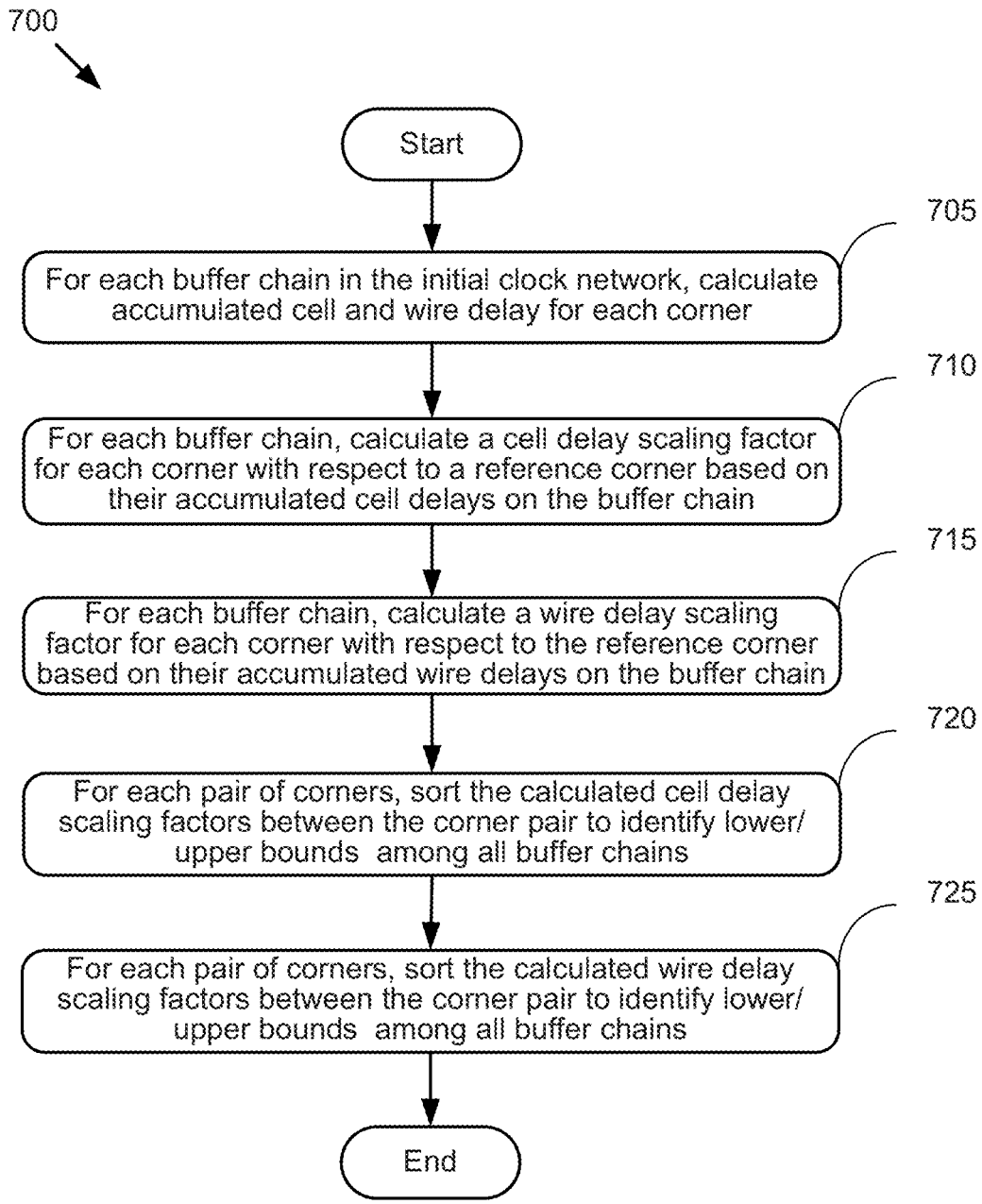
FIG. 7 illustrates a flowchart of one embodiment for calculating cell and wire corner scaling constraints.

FIG. 7 illustrates a flowchart of one embodiment for calculating cell and wire corner scaling constraints. Specifically, this figure describes a process 700 that identifies lower and upper bounds of cell and wire delay scaling factors among all buffer chains. In some embodiments, the process 700 starts when a clock network synthesis tool generates cell and wire corner scaling constraints for solving a mathematical programming problem. As shown in the figure, the process 700 begins by calculating (at block 705) accumulated cell and wire delay for each buffer chain in the initial clock network in each corner.

At block 710, for each buffer chain, the process 700 calculates a cell delay scaling factor for each corner with respect to a reference corner based on a ratio between their respective accumulated cell delays on the buffer chain. Next, for each buffer chain, the process calculates (at block 715) a wire delay scaling factor for each corner with respect to the reference corner based on a ratio between their respective accumulated wire delays on the buffer chain.

At block 720, for each pair of corners, the process 700 sorts the calculated cell delay scaling factors between the corner pair to identify lower and upper bounds of the cell delay scaling factors among all buffer chains, i.e., the minimum and maximum cell delay scaling factors. Next, for each pair of corners, the process sorts (at block 725) the calculated wire delay scaling factors between the corner pair to identify lower and upper bounds of the wire delay scaling factors among all buffer chains, i.e., the minimum and maximum wire delay scaling factors. The process 700 then ends.

One of ordinary skill in the art will recognize that the process 700 is a conceptual representation of the operations used to calculate cell and wire corner scaling constraints. The specific operations of the process 700 may not be performed in the exact order shown and described. For example, in some embodiments, blocks 710 and 715 are performed in parallel or in reverse order, and blocks 720 and 725 are performed in parallel or in reverse order. The specific operations may not be performed in one continuous series of operations, and different specific operations may be performed in different embodiments. Furthermore, the process could be implemented using several sub-processes, or as part of a larger macro process. For instance, in some embodiments, the process 700 is performed by one or more software applications that execute on one or more computers.

Today's IC often contains areas which are not turned on/off at the same time or areas which may not require exactly the same voltage. Therefore, the IC layout is often divided into various areas with different power/supply requirements called domains. As such, there might be multiple domains in an IC design. In some domains, only a specific subset of buffers/inverters can be properly placed.

Figure 8:
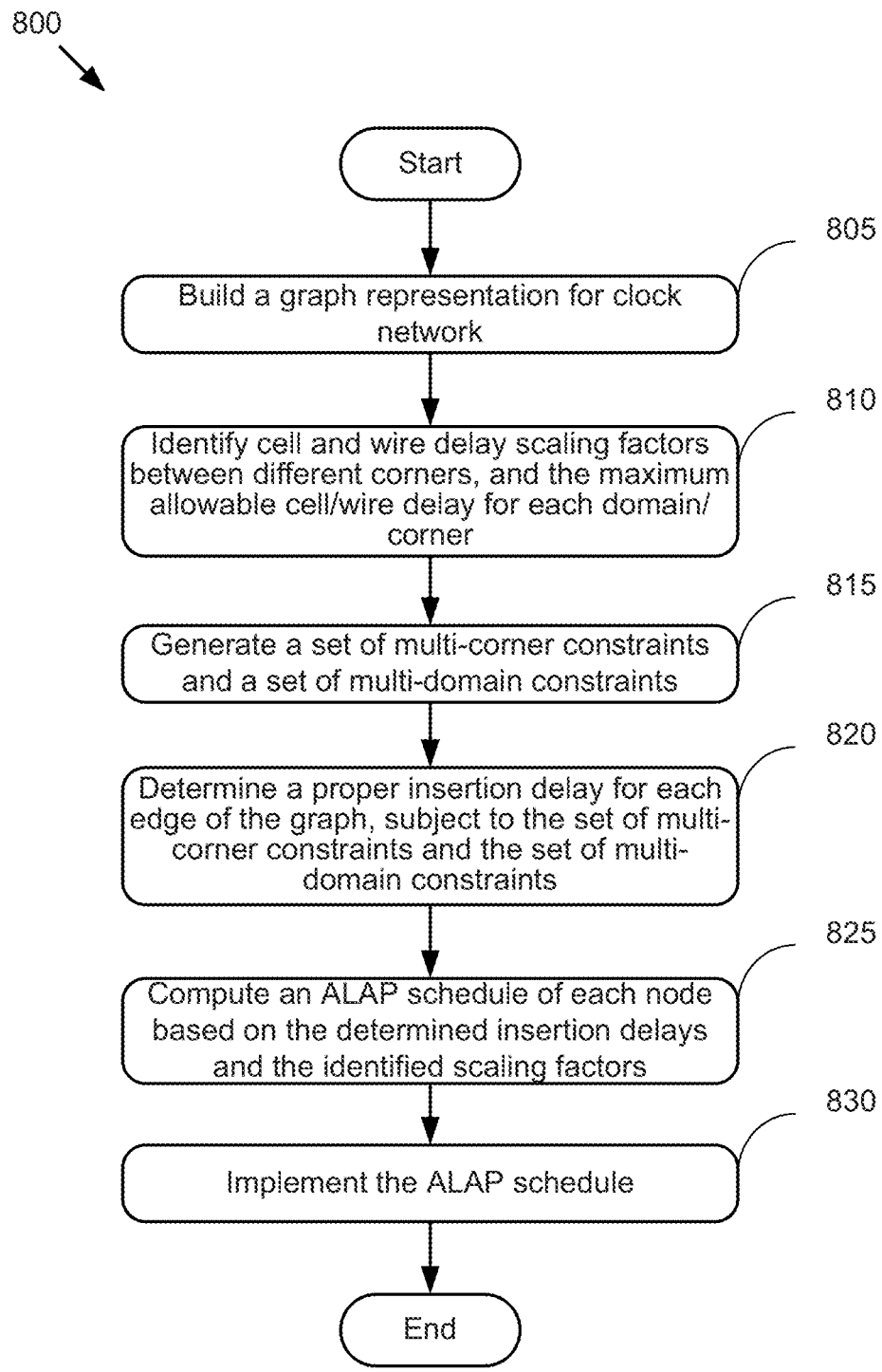
FIG. 8 illustrates a flowchart of one embodiment of using a clock network synthesis tool to handle multi-domain designs in accordance with the present invention.

FIG. 8 illustrates a flowchart of one embodiment of using a clock network synthesis tool to handle multi-domain designs in accordance with the present invention. Specifically, this figure describes a process 800 that uses mathematical programming to solve for a globally optimal solution for a multi-domain design. In some embodiments, the process 800 starts after a clock network synthesis tool receives a clock network for skew balancing. As shown in the figure, the process 800 begins by building (at block 805) a graph representation for the clock network. In some embodiments, the graph representation is a directional graph that includes nodes and edges. Each node represents a flip-flop or another clock-driven circuit component. Each edge represents the delay between the two nodes connected by the edge.

At block 810, the process 800 identifies cell and wire delay scaling factors between different corners, as well as maximum allowable cell and wire insertion delays for each domain at different corners. One embodiment of calculating cell and wire delay scaling factors is described above in reference to FIG. 7. The maximum allowable cell and wire insertion delays are determined based on the domain size and congestion information.

At block 815, the process 800 generates a set of multi-corner and a set of multi-domain constraints for the graph representation of the clock network. The process then determines (at block 820) the proper insertion delay for each edge of the graph in order to achieve the optimal value of the objective function, subject to the set of multi-corner constraints and the set of multi-domain constraints. For each edge, an insertion delay is the sum of cell insertion delay and wire insertion delay. In some embodiments, the process 800 uses mathematical programming to solve for the proper insertion delay for each edge based on the set of multi-domain constraints.

For example, by using linear programming, the problem of finding the minimal achievable skew of the clock network can be expressed as:

Minimize: $skew_{max}$
Subject to:

$AT_{c,\theta,j} = AT_{c,\theta,i} + C_{c,ij} + d_{c,ij}^{cell} + d_{c,ij}^{wire}$ (Edge relation)

$l_{c,sg} \leq AT_{c,\theta,k} - offset_{c,\theta,k} \leq L_{c,sg}$ (Endpoint constraint)

$L_{c,sg} - l_{c,sg} \leq skew_{c,sg}$ (Skew limit)

$L_{c,sg} \leq L_{max}$ (Maximum latency constraint)

$skew_{c,sg} \leq skew_{max}$ (Maximum skew constraint)

$\alpha_{c,r} d_{r,ij}^{cell} \leq d_{c,ij}^{cell} \leq A_{c,r} d_{r,ij}^{cell}$ (Cell corner scaling constraint)

$\beta_{c,r} d_{r,ij}^{wire} \leq d_{c,ij}^{wire} \leq B_{c,r} d_{r,ij}^{wire}$ (Wire corner scaling constraint)

$$\sum_{ij \in domain(n)} d_{r,ij}^{cell} \leq D_{r,n}^{cell}$$

(Floorplan cell area constraint)

$$\sum_{ij \in domain(n)} d_{r,ij}^{wire} \leq D_{r,n}^{wire}$$

(Floorplan wire area constraint)
where $$\sum_{ij \in domain(n)} d_{r,ij}^{cell}$$

is the total cell insertion delay for domain n at a corner r,
$D_{r,n}^{cell}$ is a constant area limit for cell insertion delay in domain n at corner r, $$\sum_{ij \in domain(n)} d_{r,ij}^{wire}$$

represents the total wire insertion delay for domain n at a corner r,
$D_{r,n}^{wire}$ represents a constant area limit for wire insertion delay in domain n at corner r,
other parameters of this problem are similar to those of the linear programming problem for solving multi-corner designs described above in reference to FIG. 5.

The objective of this linear programming problem is to determine the proper cell and wire insertion delays for each edge of the graph in order to minimize the maximum skew for the graph. The linear programming problem is subject to a set of multi-domain constraints. Besides the set of multi-corner constraints of the linear programming problem for solving multi-corner designs described above in reference to FIG. 5, the set of multi-domain constraints include a floorplan cell area constraint and a floorplan wire area constraint. The floorplan cell area constraint $$\sum_{ij \in domain(n)} d_{r,ij}^{cell} \leq D_{r,n}^{cell}$$

specifies that the total cell insertion delay for a domain at a corner cannot exceed a constant area value for cell insertion delay in the domain at the corner, which is determined by the size and the cell density of the domain. The floorplan wire area constraint $$\sum_{ij \in domain(n)} d_{r,ij}^{wire} \leq D_{r,n}^{wire}$$

specifies that the total wire insertion delay for a domain at a corner cannot exceed a constant area value for wire insertion delay in the domain at the reference corner, which is determined by the size and the wire density of the domain. The constant area values for cell and wire insertion delay in a domain are determined based on the domain size and congestion information. By solving this linear programming problem with these multi-domain constraints, the clock network synthesis tool is able to determine the minimum cell and wire insertion delays for each edge of the graph.

At block 825, the process 800 computes an ALAP schedule for each node of the graph representation of the clock network based on the determined insertion delays and the identified scaling factors. One embodiment of transformation to the ALAP schedule is described above in reference to FIG. 6.

At block 830, the process 800 implements the ALAP schedule for the insertion delays. In some embodiments, the ALAP schedule is implemented in a top-down order. The delay implementation tries to achieve the target latency of each node as closely as possible, but never exceeds the target latency. The process 800 then terminates.

One of ordinary skill in the art will recognize that the process 800 is a conceptual representation of the operations used to perform clock network synthesis. The specific operations of the process 800 may not be performed in the exact order shown and described. The specific operations may not be performed in one continuous series of operations, and different specific operations may be performed in different embodiments. Furthermore, the process could be implemented using several sub-processes, or as part of a larger macro process. For instance, in some embodiments, the process 800 is performed by one or more software applications that execute on one or more computers.

Figure 9:
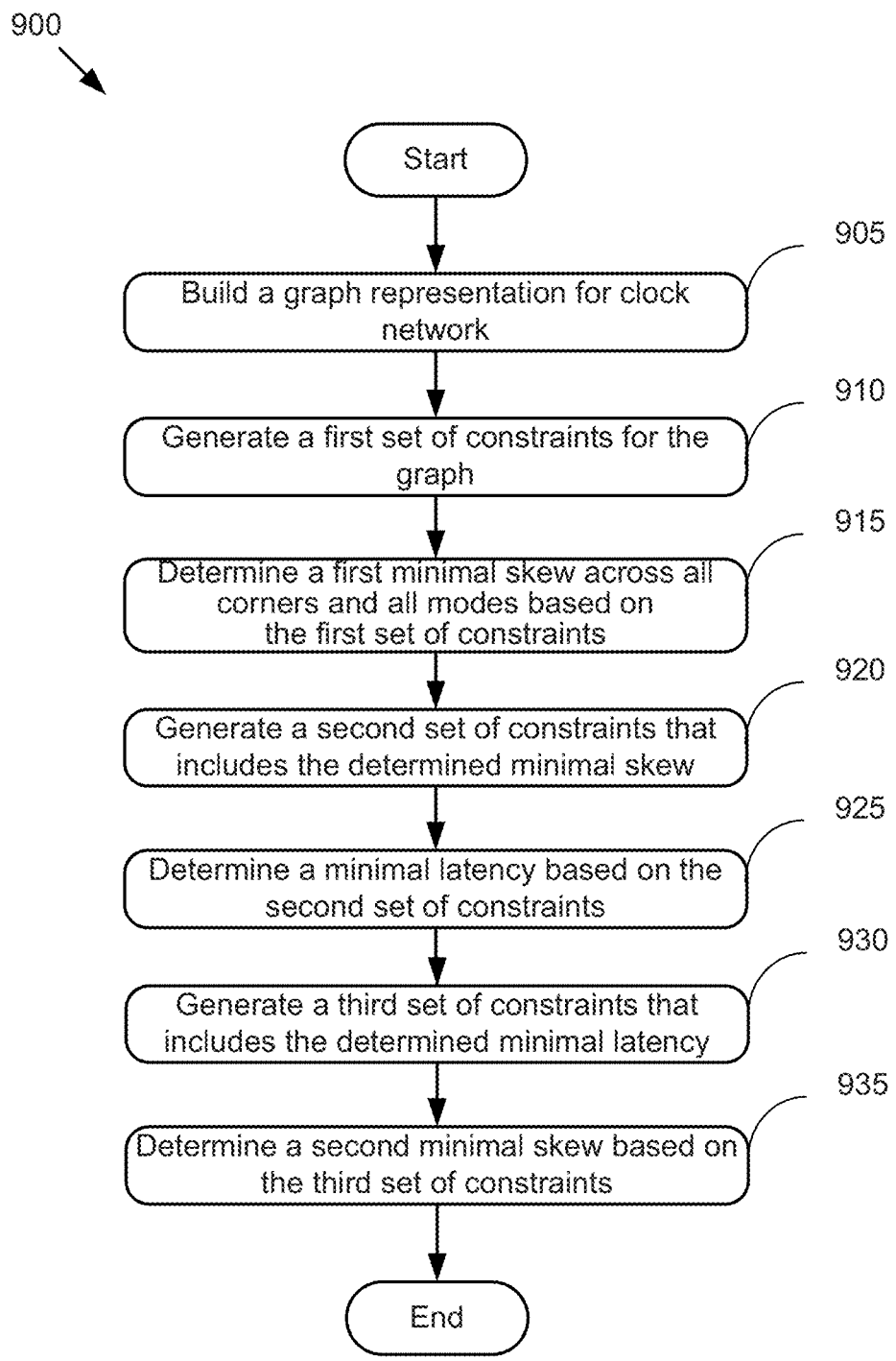
FIG. 9 illustrates a flowchart of one embodiment of determining optimal target skew and latency for complex clock systems.

FIG. 9 illustrates a flowchart of one embodiment of determining optimal target skew and latency for complex clock systems. Specifically, this figure describes a process 900 that uses three steps of mathematical programming to solve for globally optimal target skew and latency for a complex clock system. In some embodiments, the process 900 starts after a clock network synthesis tool receives a clock network for skew balancing. As shown in the figure, the process 900 begins by building (at block 905) a graph representation for the clock network. In some embodiments, the graph representation is a directional graph that includes nodes and edges. Each node represents a flip-flop or another clock-driven circuit component. Each edge represents the delay between the two nodes connected by the edge.

At block 910, the process 900 generates a first set of constraints for the graph representation of the clock network. The process then determines (at block 915) a first minimal skew across all corners and all modes based on the first set of constraints. In some embodiments, the process 900 uses mathematical programming to solve for the minimal achievable skew based on the first set of constraints.

For example, by using linear programming, the problem of finding the minimal achievable skew across all corners and all modes can be expressed as:

Minimize: $skew_{max}$
Subject to:

$AT_{c,\theta,j} = AT_{c,\theta,i} + C_{c,ij} + d_{c,ij}^{cell} + d_{c,ij}^{wire}$ (Edge relation)

$l_{c,sg} \leq AT_{c,\theta,k} - offset_{c,\theta,k} \leq L_{c,sg}$ (Endpoint constraint)

$L_{c,sg} - l_{c,sg} \leq skew_{c,sg}$ (Skew limit)

$L_{c,sg} \leq L_{max}$ (Maximum latency constraint)

$skew_{c,sg} \leq skew_{max}$ (Maximum skew constraint)

$\alpha_{c,r} d_{r,ij}^{cell} \leq d_{c,ij}^{cell} \leq A_{c,r} d_{r,ij}^{cell}$ (Cell corner scaling constraint)

$\beta_{c,r} d_{r,ij}^{wire} \leq d_{c,ij}^{wire} \leq B_{c,r} d_{r,ij}^{wire}$ (Wire corner scaling constraint)

where the parameters and constraints of this problem are similar to those of the linear programming problem for solving multi-corner designs described above in reference to FIG. 5.

At block 920, the process 900 generates a second set of constraints that includes the determined first minimal skew. The process then determines (at block 925) a minimal latency based on the second set of constraints. In some embodiments, the process 900 uses mathematical programming to solve for the minimal latency based on the second set of constraints that include the determined minimal achievable skew.

For example, by using linear programming, the problem of finding the minimal latency can be expressed as:

Minimize: $L_{max}$

Subject to:

| | |
|---|---|
| $AT_{c,\theta,j} = AT_{c,\theta,i} + C_{c,ij} + d_{c,ij}^{cell} + d_{c,ij}^{wire}$ | (Edge relation) |
| $l_{c,sg} \leq AT_{c,\theta,k} - \text{offset}_{c,\theta,k} \leq L_{c,sg}$ | (Endpoint constraint) |
| $L_{c,sg} - l_{c,sg} \leq \text{skew}_{c,sg}$ | (Skew limit) |
| $L_{c,sg} \leq L_{max}$ | (Maximum latency constraint) |
| $\text{skew}_{c,sg} \leq \max(\text{skew}_{c,sg}^0, \text{skew}_{c,sg}^{user})$ | (Maximum skew constraint) |
| $\alpha_{c,r} d_{r,ij}^{cell} \leq d_{c,ij}^{cell} \leq A_{c,r} d_{r,ij}^{cell}$ | (Cell corner scaling constraint) |
| $\beta_{c,r} d_{r,ij}^{wire} \leq d_{c,ij}^{wire} \leq B_{c,r} d_{r,ij}^{wire}$ | (Wire corner scaling constraint) | where $\text{skew}_{c,sg}$ is the skew limit for latency of skew group sg and corner c, $\text{skew}_{c,sg}^0$ is the minimal achievable skew for skew group sg and corner c calculated at block 915, $\text{skew}_{c,sg}^{user}$ is the user defined skew for skew group sg and corner c, other parameters of this problem are similar to those of the linear programming problem for solving multi-corner designs described above in reference to FIG. 5.

The maximum skew constraint $\text{skew}_{c,sg} \leq \max(\text{skew}_{c,sg}^0, \text{skew}_{c,sg}^{user})$ specifies that the skew limit for each skew group and each corner should be less than or equal to the greater of the minimal achievable skew calculated at block 915 and the user defined skew for the skew group and the corner. Other constraints of the linear programming problem are similar to those of the linear programming problem for solving multi-corner designs described above in reference to FIG. 5.

At block 930, the process 900 generates a third set of constraints that includes the determined minimal latency. Next, the process determines (at block 935) a second minimal skew based on the third set of constraints. In some embodiments, the process 900 uses mathematical programming to solve for the minimal skew based on the third set of constraints that include the determined minimal latency.

For example, by using linear programming, the problem of finding the second minimal skew can be expressed as:

Minimize: $\text{skew}_{max}$

Subject to:

| | |
|---|---|
| $AT_{c,\theta,j} = AT_{c,\theta,i} + C_{c,ij} + d_{c,ij}^{cell} + d_{c,ij}^{wire}$ | (Edge relation) |
| $l_{c,sg} \leq AT_{c,\theta,k} - \text{offset}_{c,\theta,k} \leq L_{c,sg}$ | (Endpoint constraint) |
| $L_{c,sg} - l_{c,sg} \leq \text{skew}_{c,sg}$ | (Skew limit) |
| $L_{c,sg} \leq L_{c,sg}^0$ | (Maximum latency constraint) |
| $\text{skew}_{c,sg} \leq \text{skew}_{max}$ | (Maximum skew constraint) |
| $\alpha_{c,r} d_{r,ij}^{cell} \leq d_{c,ij}^{cell} \leq A_{c,r} d_{r,ij}^{cell}$ | (Cell corner scaling constraint) |
| $\beta_{c,r} d_{r,ij}^{wire} \leq d_{c,ij}^{wire} \leq B_{c,r} d_{r,ij}^{wire}$ | (Wire corner scaling constraint) | where $L_{c,sg}^0$ is the minimal achievable latency for skew group sg and corner c determined at block 925, other parameters of this problem are similar to those of the linear programming problem for solving multi-corner designs described above in reference to FIG. 5.

The maximum latency constraint $L_{c,sg} \leq L_{c,sg}^0$ specifies that the maximum latency for each skew group and each corner should be less than or equal to the minimal achievable latency for the skew group and the corner determined at block 925. Other constraints of the linear programming problem are similar to those of the linear programming problem for solving multi-corner designs described above in reference to FIG. 5.

The process 900 then ends. This three-step process can predict the minimal skew before clock network synthesis and determine the cost of latency for a given skew target. The results provide for best skew and best latency solutions for complex clock systems.

The clock network synthesis tool of some embodiments transforms the solution to an ALAP schedule for each node of the graph representing the clock network. The ALAP schedule transformation for process 900 is similar to the multi-corner ALAP schedule transformation described above in reference to FIG. 6. In some embodiments, the ALAP schedule transformation is performed after all three steps of mathematical programming of process 900 have been completed. In other embodiments, the ALAP schedule transformation is performed multiple times, e.g., after each step of mathematical programming of process 900.

One of ordinary skill in the art will recognize that the process 900 is a conceptual representation of the operations used to perform clock network synthesis. The specific operations of the process 900 may not be performed in the exact order shown and described. The specific operations may not be performed in one continuous series of operations, and different specific operations may be performed in different embodiments. Furthermore, the process could be implemented using several sub-processes, or as part of a larger macro process. For instance, in some embodiments, the process 900 is performed by one or more software applications that execute on one or more computers.

One of ordinary kill in the art will also recognize that the method described by process 900 does not have to use three steps of mathematical programming to solve for globally optimal target skew and latency. In some embodiments, the invention can use more or less steps of mathematical programming to achieve the same objective. The method of some embodiments first predicts the minimal possible skew, for example, by solving a mathematical programming problem. The method then determines a good skew target, automatically or by user interaction. For example, by showing user the predicted minimal possible skew, the user is able to adjust the skew target to make it a reasonable target to achieve. The method then achieves a result that optimizes skew, insertion delay and clock area at the same time.

In essence, some embodiments of the method first predict the best achievable target constraint automatically, e.g., by solving a mathematical programming problem. The method then interacts with the user to determine a reasonable target constraint. This prevents the scenario that optimal solution cannot be achieved because of unreasonable target constraints. The method then determines an optimal solution to satisfy multiple constraints at the same time, e.g., by solving additional mathematical programming problems.

Figure 10:
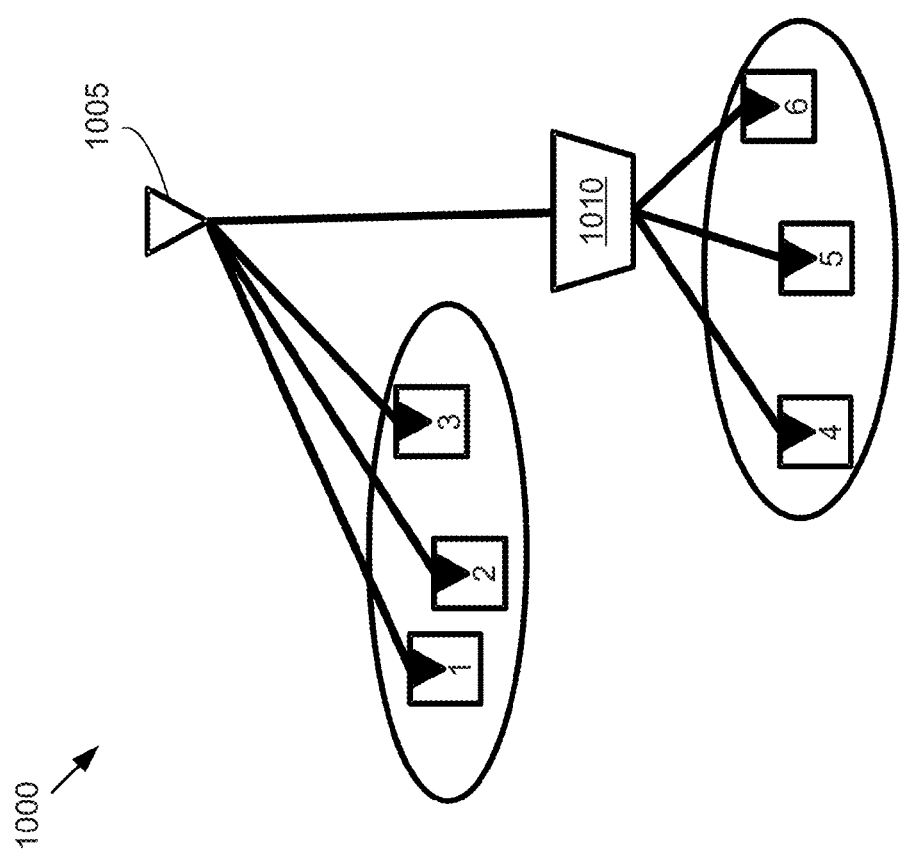
FIG. 10 conceptually illustrates one embodiment of a method of linear programming formulation simplification for runtime improvement.

When a linear programming problem deals with a clock network that has a lot of nodes, the computation complexity can be prohibitively expensive. Therefore, in some embodiments, LP formulation simplification is introduced for runtime improvement. FIG. 10 conceptually illustrates one embodiment of such a method of LP formulation simplification for runtime improvement. The clock network 1000 includes two clock endpoint drivers 1005 and 1010. The clock endpoint driver 1005 drives clock endpoints 1-3. The clock endpoint driver 1010 drives clock endpoints 4-6.

When no runtime improvement is implemented, the clock arrival times of all the endpoints are calculated and adjusted to satisfy all the constraints of the linear program. In an enhanced LP formulation for runtime reduction, all the target arrival time variables at the clock endpoints are eliminated. Instead, for each clock endpoint driver, the method introduces a variable to represent the target arrival time for all the clock endpoints driven by the driver. For example, for clock endpoint driver 1005, the method introduces a variable to represent the target arrival time for the clock endpoints 1-3. Similarly, the method introduces a variable for clock endpoint driver 1010 to represent the target arrival time for the clock endpoints 4-6. As a result of implementing this method, the LP problem size is greatly reduced and a huge runtime benefit is realized.

In some embodiments, at the conclusion of the budgeting phase, the method determines whether the skew or insertion delay for the clock network is acceptable. In some embodiments, the skew or insertion delay is determined to be acceptable when it is below a pre-determined threshold. In some embodiments, the result of the budgeting phase is presented to a user and let the user to determine whether the result is acceptable. If the skew or insertion delay for the clock network is acceptable, the method continues to the implementation phase, which is described below in Section II. If the skew of insertion delay is not acceptable, the method stops and the user, either manually or use another program, will try to resolve the conflicts in design constraints. Therefore, the budgeting phase can be a powerful tool for estimating feasible clock skew and latency.

II. Implementing Insertion Delay

The second phase of the two-phase process for clock network synthesis is "implementation." Given the multi-dimensional vector of the target delays to be inserted at each edge, the clock network synthesis tool of some embodiments utilizes a set of procedures to determine the optimal buffer type, size, and buffering distance to achieve the desired multi-corner delays. The clock network synthesis tool of some embodiments also employs a general system to consider routing congestion information during the placement and routing of clock buffers and/or inverters so that the feasibility of the clock network generated by this system is maximized.

Figure 11:
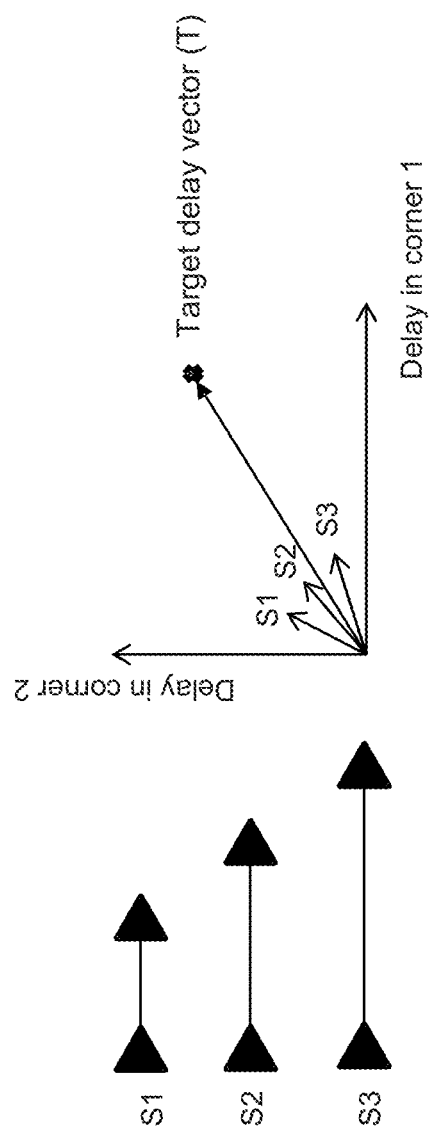
FIG. 11 conceptually illustrates one embodiment of the problem of determining optimal buffering configuration to minimize error at each edge of the graph representing a clock network.

FIG. 11 conceptually illustrates one embodiment of the problem of determining optimal buffering configuration to minimize error at each edge of the graph representing the clock network. As shown in the figure, there are three different buffers S1-S3, each of which has different type, size, and/or wire length.

In a vector space consists of two dimensions corresponding to corner 1 and corner 2, the target delay vector T is the desired insertion delay for a particular edge in corners 1 and 2. Since none of buffers S1-S3 has exactly the same delay vector, i.e., the same delay in both corner 1 and corner 2, as the target delay vector T, a combination of buffers S1-S3 is determined in order to achieve the target delay vector T. For example, when the target delay vector is (100, 200), the clock network synthesis tool can select a combination of five buffers having the same delay vector (20, 35) to achieve an accumulated vector of (100, 175). Or the clock network synthesis tool can select a combination of two buffers having delay vector (40, 60) and one buffer having delay vector (20, 80) to achieve an accumulated vector of (100, 200).

When there are multiple buffering solutions available, the clock network synthesis tool will select the buffering solution that can get closest to the target delay vector. In the example described above, the clock network synthesis tool will select the combination of two buffers having delay vector (40, 60) and one buffer having delay vector (20, 80) because this solution achieves exactly the target delay vector of (100, 200).

Figure 12:
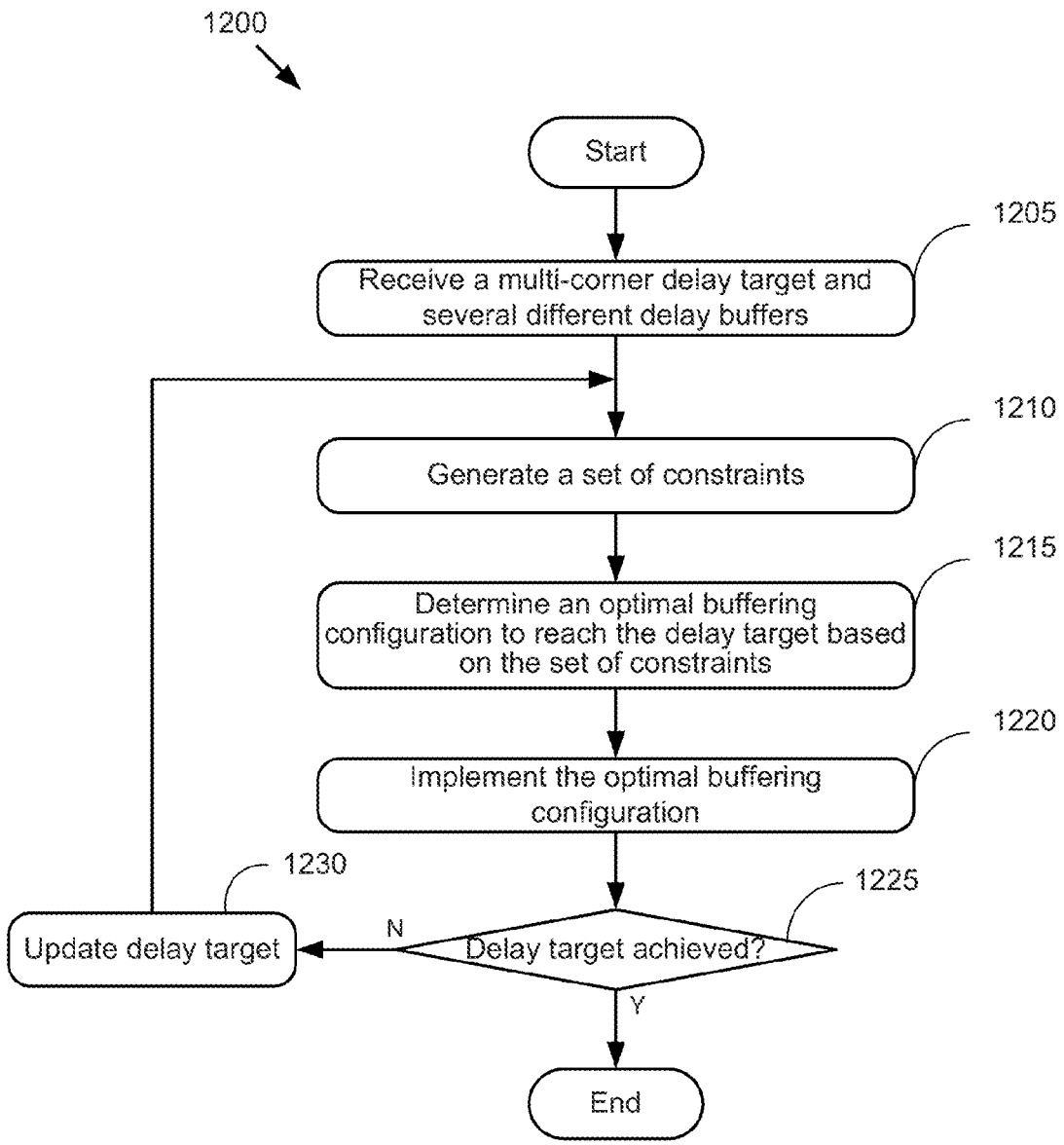
FIG. 12 illustrates a flowchart of one embodiment of determining optimal multi-corner buffering configurations.

FIG. 12 illustrates a flowchart of one embodiment of determining optimal multi-corner buffering configurations. Specifically, this figure describes a process 1200 that uses mathematical programming to solve for optimal solutions for multi-corner buffering configuration. In some embodiments, the process 1200 starts after a clock network synthesis tool has determined a target insertion delay for each edge of the graph representation of a clock network. As shown in the figure, the process 1200 begins by receiving (at block 1205) a multi-corner delay target and several different delay buffers. Different delay buffers have different types, sizes and/or wire lengths, thus have different multi-corner delays.

At block 1210, the process 1200 generates a set of constraints. The process then determines (at block 1215) an optimal buffering configuration to reach the delay target based on the set of constraints. In some embodiments, the process 1200 uses mathematical programming to solve for the optimal buffering configuration based on the set of constraints.

For example, by using linear programming, the problem of finding an optimal buffering configuration can be expressed as:

$$\text{Minimize cost} = \sum_{i=1}^{N} x_i b_i$$

Subject to:

$$Error_j = T^j - \sum_{i=1}^{N} x_i d_i \le \theta_j$$

and $$x_i \ge 0 \text{ for } i = 1 \text{ to } N$$

where
i=1 to N represents different buffer configurations, j represents different corners,
$x_i$ represents the number of buffer configuration i used in the final solution,
$b_i$ represents the cost of each buffer configuration,
$T^j$ represents the target delay addition in corner j,
$d_i^j$ represents the delay of buffer configuration i in corner j, and
$\theta_j$ represents a small delay in corner j that can be accepted as error in delay target.

The objective of this linear programming problem is to determine the optimal buffering configuration to minimize insertion delay error at each edge. The linear programming problem is subject to a set of constraints. For example, the insertion delay error constraint $Error_j = T^j - \Sigma_{i=1}^{N} x_i d_i \le \theta_j$ specifies that the insertion delay error in corner j, i.e., the difference between the target delay addition in corner j and the total cost of the buffering configuration in corner should be less than or equal to the small delay in corner j that can be accepted as error in delay target. By solving this linear programming problem with the set of constraints, the clock network synthesis tool is able to determine the optimal buffering configuration.

At block 1220, the process 1200 implements the determined optimal buffering configuration. The process then determines (at block 1225) whether the delay target has been achieved by the implemented buffering configuration. In some embodiments, the delay target is achieved when the implemented multi-corner delay is close to or greater than the multi-corner delay target.

When the process 1200 determines (at block 1225) that the delay target has not been achieved, the process updates (at block 1230) the delay target based on the implemented buffering configuration. The process then loops back to the block 1210 to solve for an optimal buffering configuration for the updated delay target. When the process determines (at block 1225) that the delay target has been achieved, the process terminates.

One of ordinary skill in the art will recognize that the process 1200 is a conceptual representation of the operations used to perform clock network synthesis. The specific operations of the process 1200 may not be performed in the exact order shown and described. The specific operations may not be performed in one continuous series of operations, and different specific operations may be performed in different embodiments. Furthermore, the process could be implemented using several sub-processes, or as part of a larger macro process. For instance, in some embodiments, the process 1200 is performed by one or more software applications that execute on one or more computers.

Figure 13:
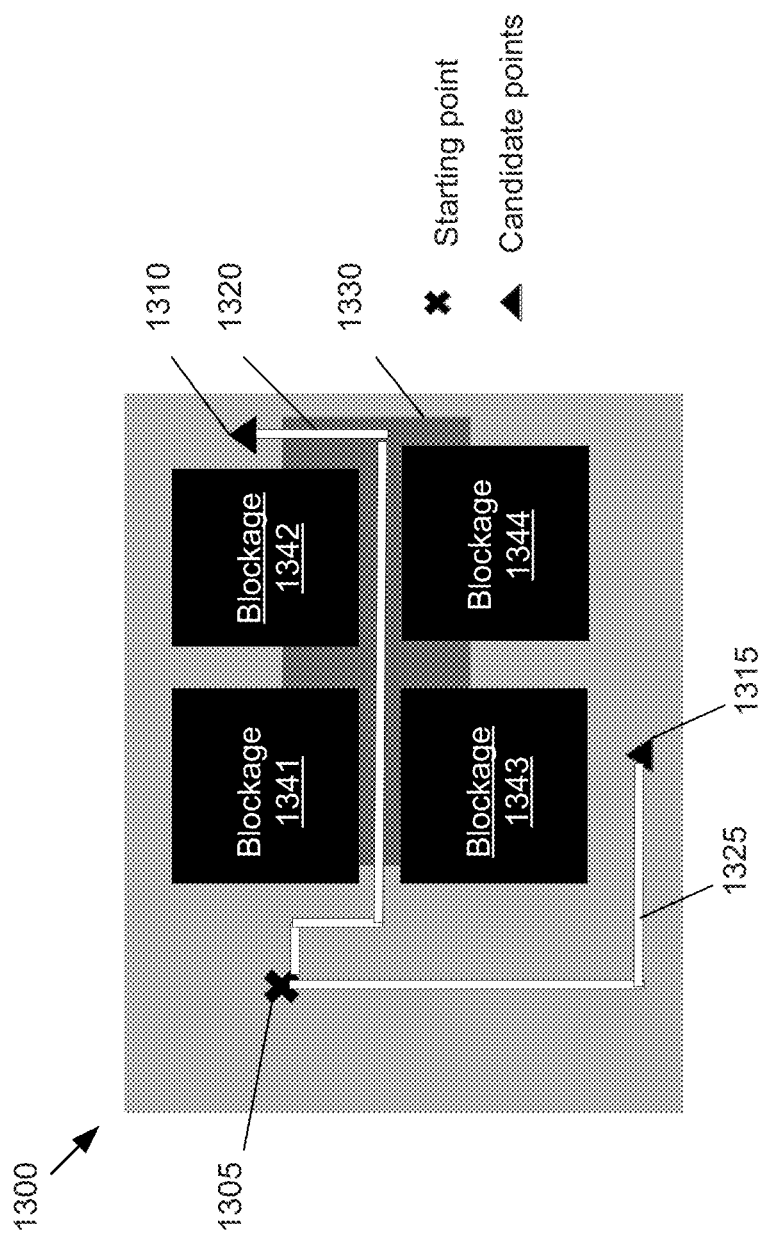
FIG. 13 illustrates an example of using congestion information to guide clock network synthesis buffer placement.

Traditionally, the clock network synthesis tool places buffers by zigzagging through a small surrounding area of a starting point. As a result, it introduces congestions around the starting point and cannot achieve an optimal solution for buffer placement and wire insertion. To overcome this problem, some embodiments of this invention take a smart walk in the floorplan in performing clock network synthesis buffer placement with the help of floorplan congestion information. FIG. 13 illustrates an example of using congestion information to guide clock network synthesis buffer placement. The floorplan 1300 includes a clock network synthesis buffer placement starting point 1305, four blockage areas 1341-1344, and a congested area 1330.

The clock network synthesis tool generates two candidate points 1310 and 1315 as potential destinations of the clock network synthesis buffer placement and wire insertion. Two routes 1320 and 1325 connect the starting point 1305 to the two candidate points 1310 and 1315, respectively. Because the clock network synthesis tool has the knowledge that the area 1330 is a congested area and the route 1320 travels through this congested area, it can easily conclude that the candidate point 1310 is not a good candidate for buffer placement and wire insertion. Instead, the clock network synthesis tool will choose the candidate point 1315 as the destination for buffer placement and wire insertion because the route 1325 does not travel through any congested area.

Figure 14:
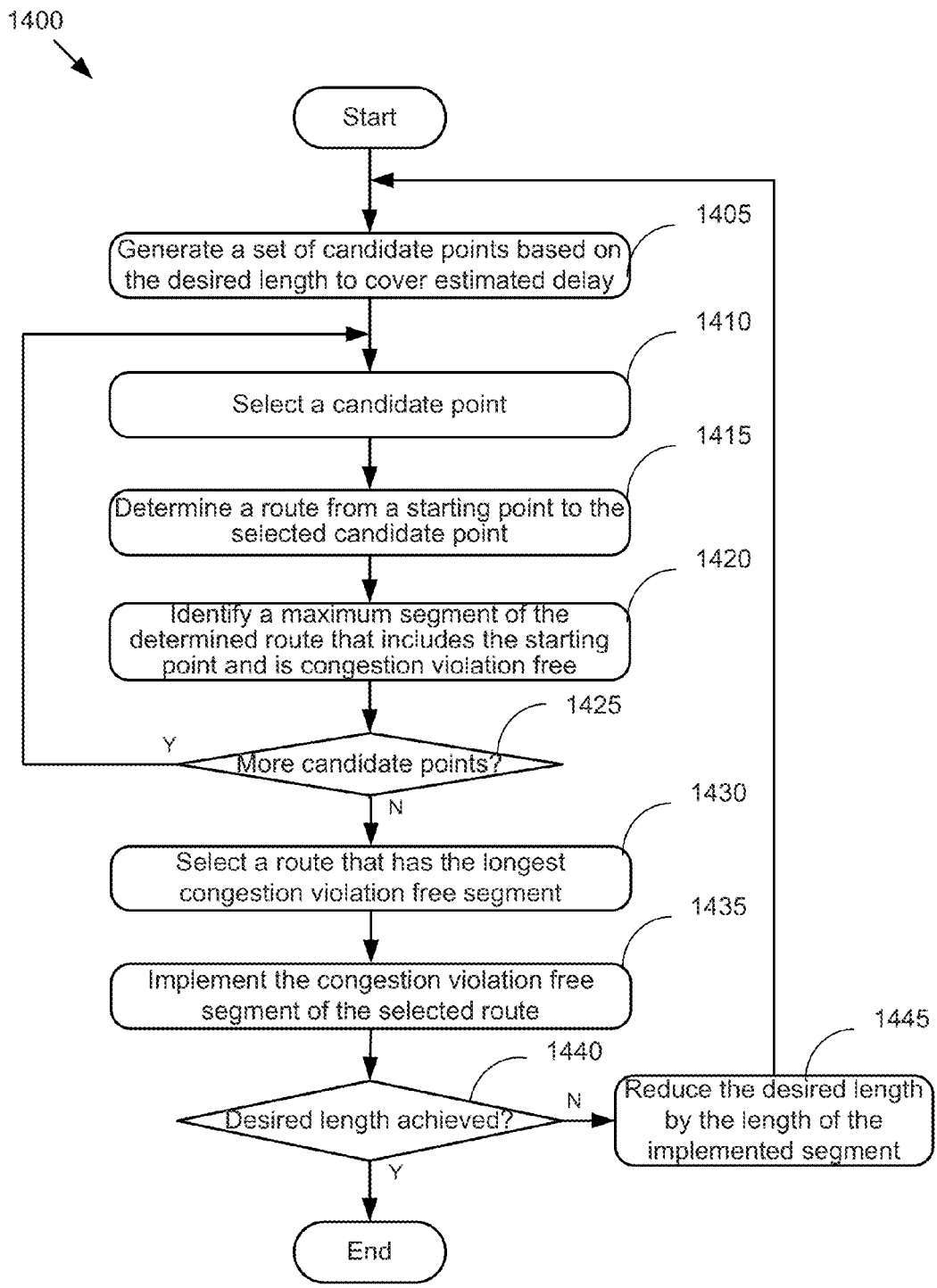
FIG. 14 illustrates a flowchart of one embodiment of performing congestion aware buffer placement and wire insertion.

FIG. 14 illustrates a flowchart of one embodiment of performing congestion aware buffer placement and wire insertion. Specifically, this figure describes a process 1400 that uses floorplan congestion information to guide clock network synthesis buffer placement and wire insertion to maximize routability. In some embodiments, the process 1400 starts after a clock network synthesis tool has determined the optimal buffering configuration for each delay target. As shown in the figure, the process 1400 begins by generating (at block 1405) a set of candidate points as a potential destination for a starting point based on the desired length to cover estimated delay.

At block 1410, the process 1400 selects a candidate point from the set of generated candidate points. The process then determines (at block 1415) a route from the starting point to the selected candidate point. In some embodiments, the process 1400 uses a router to determine a least effort route to the selected candidate.

Next, the process 1400 identifies (at block 1420) a maximum segment of the determined route that includes the starting point and is congestion violation free. At block 1425, the process determines whether there are more candidate points that need to be processed. When there are more candidate points, the process loops back to block 1410 to select another candidate point. When the process determines that there is no more candidate point to process, it selects (at block 1430) a route that has the longest congestion violation free segment that includes the starting point.

At block 1435, the process 1400 implements the congestion violation free segment of the selected route by inserting buffers along the segment. Next, the process determines (at block 1440) whether the desired length to cover estimated delay has been achieved. When the desired length has not been achieved, the process reduces (at block 1445) the desired length to cover estimated delay by the length of the implemented route segment. The process then loops back to block 1405 to generate a set of candidate points based on the reduced desired length. When the process 1400 determines (at block 1440) that the desired length has been achieved, the process terminates.

One of ordinary skill in the art will recognize that the process 1400 is a conceptual representation of the operations used to perform clock network synthesis. The specific operations of the process 1400 may not be performed in the exact order shown and described. The specific operations may not be performed in one continuous series of operations, and different specific operations may be performed in different embodiments. Furthermore, the process could be implemented using several sub-processes, or as part of a larger macro process. For instance, in some embodiments, the process 1400 is performed by one or more software applications that execute on one or more computers.

III. Clock Tree Synthesis System

Figure 15:
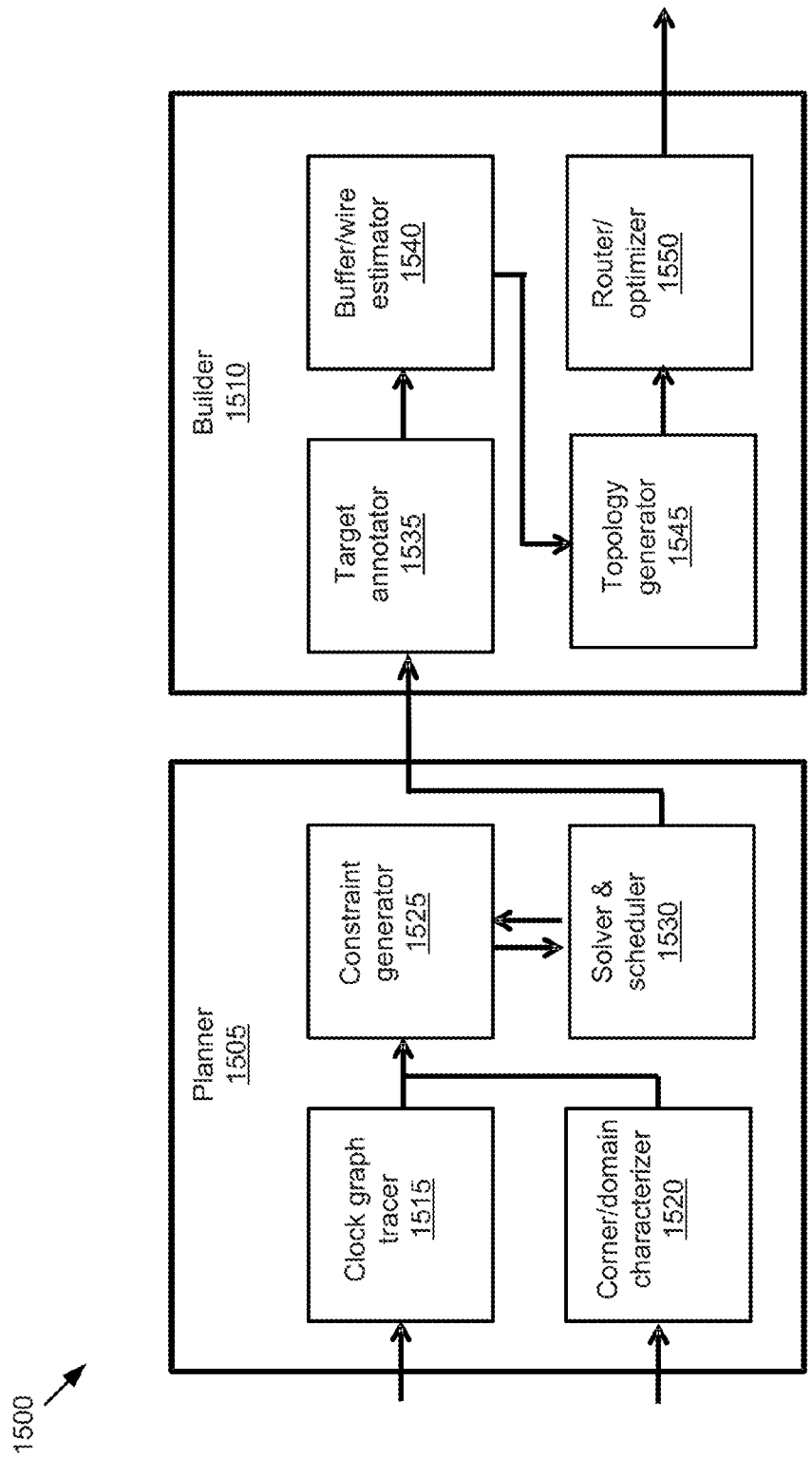
FIG. 15 conceptually illustrates one embodiment of a clock network synthesis system.

FIG. 15 conceptually illustrates one embodiment of a clock network synthesis system 1500. Specifically, the figure illustrates a set of components for performing the clock network synthesis operations. In some embodiments, the clock network synthesis system 1500 is a stand-alone system, while in other embodiments the clock network synthesis system 1500 is part of a system for performing electronic design automation (EDA) operations. As shown in the figure, the clock network synthesis system includes two component blocks: planner 1505 and builder 1510. The planner 1505 performs the budgeting phase of the clock network synthesis operation and the builder 1510 performs the implementation phase of the clock network synthesis operation. The planner 1505 includes a clock graph tracer 1515, a corner and domain characterizer 1520, a constraint generator 1525, and a solver and scheduler 1530. The builder 1510 includes a target annotator 1535, a buffer and wire estimator 1540, a topology generator 1545, and a router and optimizer 1550.

The clock graph tracer 1515 receives a clock network and generates a graph representation of the clock network. In some embodiments, the graph representation is a directional graph that includes nodes and edges. Each node represents a flip-flop or another clock-driven circuit component. Each edge represents the delay between the two nodes connected by the edge. The corner and domain characterizer 1520 receives a multi-corner and/or multi-domain circuit design and identifies different corners and/or different domains and their associated characteristics.

The constraint generator 1525 receives the graph representation of the clock network from the clock tracer 1515 and the corner and/or domain information from the corner and domain characterizer 1520. The constraint generator 1525 then generates a set of multi-corner or multi-domain constraints for the graph.

The solver and scheduler 1530 receives the set of constraints from the constraint generator 1525 and performs mathematical programming to determine the optimal insertion delay for each edge of the graph based on the set of received constraints. The solver and scheduler 1530 then transforms the determined insertion delays into an ALAP schedule. In some embodiments, the solver and scheduler 1530 sends the solution to the mathematical programming problem back to the constraint generator 1525 to generate a new set of constraints. The new set of constraints is then sent to the solver and scheduler 1530 for solving a new mathematical programming problem. And the back and forth between the two components repeats for several iterations. In some embodiments, the transformation to an ALAP schedule happens after all iterations of constraint generation and mathematical programming problem solving have been completed. In other embodiments, the transformation to an ALAP schedule happens after each iteration of the constraint generation and mathematical programming problem solving.

The target annotator 1535 receives an insertion delay schedule from the solver and scheduler 1530 and annotates a target delay vector for each edge of the graph. The buffer and wire estimator 1540 receives the target delay vectors from the target annotator 1535 and identifies an optimal buffering configuration for each target delay vector to minimize insertion delay error at each edge.

The topology generator 1545 receives the buffering configuration from the buffer and wire estimator 1540 and generates a set of candidate points for each estimated delay. The topology generator 1545 then determines a route from the starting point to each candidate points. The router and optimizer 1550 receives the generated routes for the candidate points from the topology generator 1545 and uses congestion information to guide the clock network synthesis buffer placement and wire insertion to maximize routability. Specifically, the router and optimizer 1550 select routes that are less congested for buffer placement and wire insertion.

IV. Embodiments of a Clock Tree Synthesis Tool

Figure 16:
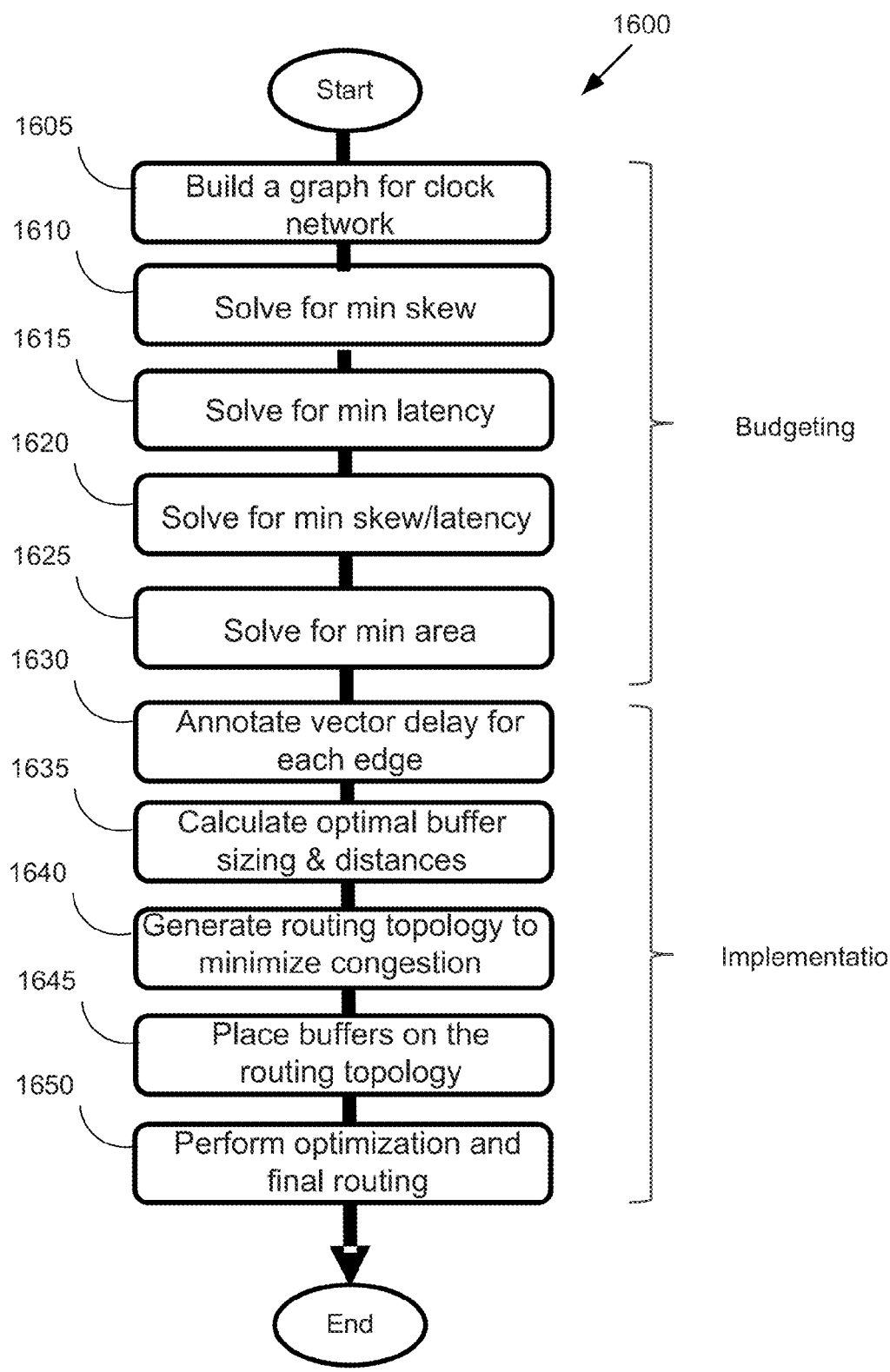
FIG. 16 is a block diagram illustrating an example of a clock network synthesis tool in accordance with the present invention.

FIG. 16 is a block diagram illustrating an example of a clock network synthesis tool in accordance with the present invention. Specifically, this figure describes a process 1600 that performs clock network synthesis operations through application of a series of mathematical programming. As shown in the figure, the process 1600 can be divided into two phases: budgeting and implementation. The blocks 1605-1625 belong to the first phase "budgeting," which identifies an optimal clock network balancing solution. The blocks 1630-1650 belong to the second phase "implementation," which implements the identified optimal clock network balancing solution. In some embodiments, the process 1600 starts after the clock network synthesis tool receives a clock network for skew balancing.

The process 1600 begins by building (at block 1605) a graph representation for a clock network. In some embodiments, the graph representation is a directional graph that includes nodes and edges. Each node represents a flip-flop or another clock-driven circuit component. Each edge represents the delay between the two nodes connected by the edge.

At block 1610, the process 1600 solves for a minimal skew for the graph. In some embodiments, this involves using mathematical programming to determine a minimal achievable skew across all corners and all modes. The process then solves (at block 1615) for a minimal latency for the graph. Specifically, the process of some embodiments uses mathematical programming to determine for the minimal latency with the minimal target skew determined at block 1610 as a constraint. Next, the process 1600 solves (at block 1620) for a minimal skew and latency for the graph. In some embodiments, the process uses mathematical programming to solve for the minimal skew with the minimal latency determined at block 1615 as a constraint. By solving the above mathematical programming problems, the process is able to determine the proper insertion delay for each edge of the graph.

At block 1625, the process 1600 solves for minimal buffering area for the determined insertion delays. In some embodiments, this involves transforming the determined insertion delays to an ALAP schedule.

In some embodiments, at the conclusion of the budgeting phase, i.e., after finishing block 1625, the process 1600 determines whether the skew or insertion delay for the clock network is acceptable. In some embodiments, the skew or insertion delay is determined to be acceptable when it is below a pre-determined threshold. In some embodiments, the result of the budgeting phase is presented to a user and let the user to determine whether the result is acceptable. If the skew or insertion delay for the clock network is acceptable, the process 1600 continues to the implementation phase, i.e., block 1630. If the skew of insertion delay is not acceptable, the process 1600 stops and the user or another process will try to resolve the conflicts in design constraints. Therefore, the budgeting phase of process 1600 can be a powerful tool for estimating feasible clock skew and latency.

At block 1630, the process 1600 annotates vector delay for each edge based on the insertion delays with minimal buffering area. Next, the process calculates (at block 1635) the optimal buffer sizing and distances for the target vector delay of each edge. In some embodiments, the process uses mathematical programming to determine the optimal buffering configuration to minimize error, i.e., the difference between the delay by selected buffer combination and the target delay, at each edge.

Next, the process 1600 generates (at block 1640) a routing topology to minimize floorplan congestion. In some embodiments, the process uses congestion information to guide the clock network synthesis tool to select less congested routes for buffer placement and wire insertion. The process then places (at block 1645) buffers on the routing topology. At block 1650, the process performs optimization and final routing. The process 1600 then ends.

One of ordinary skill in the art will recognize that the process 1600 is a conceptual representation of the operations used to perform clock network synthesis. The specific operations of the process 1600 may not be performed in the exact order shown and described. The specific operations may not be performed in one continuous series of operations, and different specific operations may be performed in different embodiments. Furthermore, the process could be implemented using several sub-processes, or as part of a larger macro process. For instance, in some embodiments, the process 1600 is performed by one or more software applications that execute on one or more computers.

This description and drawings are illustrative of embodiments of the invention and are not to be construed as limiting the invention. Numerous specific details are described to provide a thorough understanding of the disclosed embodiments. However, in certain instances, well known or conventional details are not described in order to avoid obscuring the description of the disclosed embodiments. References to "an" or "one" embodiment in the present disclosure are not necessarily to the same embodiment; such references mean at least one embodiment.

V. Digital Processing System

Many of the methods of the disclosed embodiments may be performed with a digital processing system, such as a conventional, general-purpose computer system. Special purpose computers, which are designed or programmed to perform only one function, may also be used.

Figure 17:
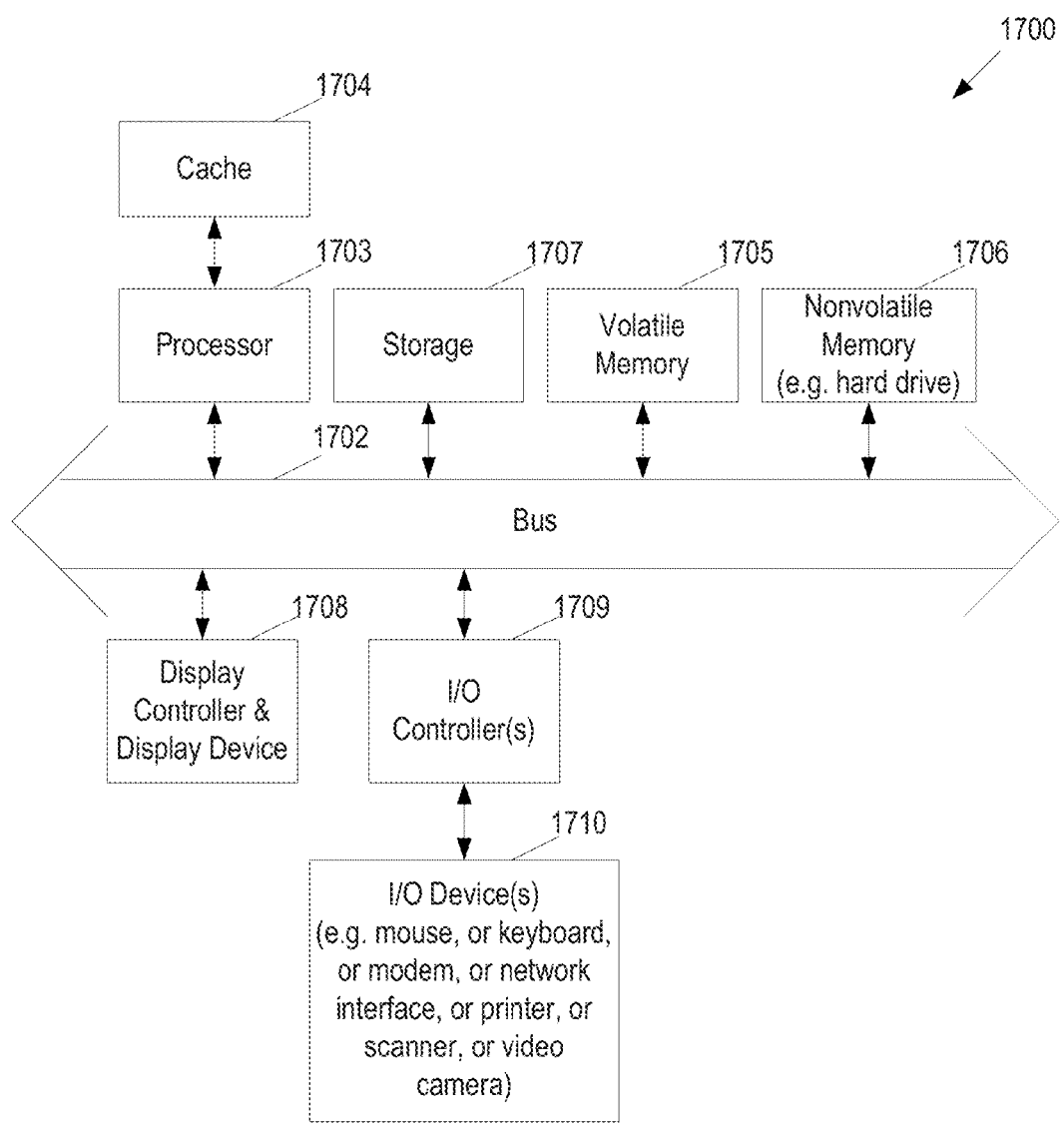
FIG. 17 shows one example of a typical computer system or data processing system that may be used with the disclosed embodiments.

FIG. 17 shows one example of a typical computer system or data processing system that may be used with the disclosed embodiments. For example, in one embodiment the processes described with respect to FIGS. 2, 5, 7-9, 12, 14, and 16 are operational through the example computing system. However, it is noted that while FIG. 17 illustrates various components of a computer system, it is not intended to represent any particular architecture or manner of interconnecting the components but rather provides an example representation of how the components and architecture may be configured. It will also be appreciated that network computers and other data processing systems that have fewer components or perhaps more components may also be used with the disclosed embodiments. The computer system of FIG. 17 may be any computing system capable of performing the described operations.

As shown in FIG. 17, the computer system 1700, which is a form of a data processing system, includes a bus 1702, which is coupled to one or more microprocessors 1703. In one embodiment, computer system 1700 includes one or more of a storage device (e.g., ROM) 1707, volatile memory (e.g., RAM) 1705, and a non-volatile memory (EEPROM, Flash) 1706. The microprocessor 1703 is coupled to cache memory 1704 as shown in the example of FIG. 17. Cache memory 1704 may be volatile or non-volatile memory.

The bus 1702 interconnects these various components together and in one embodiment interconnects these components 1703, 1707, 1705, and 1706 to a display controller and display device 1708. The computer system 1700 may further include peripheral devices such as input/output (I/O) devices, which may be mice, keyboards, modems, network interfaces, printers, scanners, video cameras and other devices which are well known in the art. Typically, the input/output devices 1710 are coupled to the system through input/output controllers 1709.

The volatile memory 1705 is typically implemented as dynamic RAM (DRAM) which requires power continually in order to refresh or maintain data in the memory. The non-volatile memory 1706 is typically a magnetic hard drive, magnetic optical drive, an optical drive, a DVD RAM, a Flash memory, or other type of memory system which maintains data even after power is removed from the system. Typically, the non-volatile memory will also be a random access memory although this is not required.

While FIG. 17 shows that the non-volatile memory is a local device coupled directly to the rest of the components in the data processing system, it will be appreciated that the disclosed embodiments may utilize a non-volatile memory which is remote from the system, such as a network storage device which is coupled to the data processing system through a network interface such as a modem or Ethernet interface.

The bus 1702 may include one or more buses connected to each other through various bridges, controllers and/or adapters as is well known in the art. In one embodiment the I/O controller 1709 includes a USB (Universal Serial Bus) adapter for controlling USB peripherals, and/or an IEEE-1394 bus adapter for controlling IEEE-1394 peripherals.

It will be apparent from this description that aspects of the disclosed embodiments may be embodied, at least in part, in software (or computer-readable instructions). That is, the techniques, for example the processes of FIGS. 2, 5, 7-9, 12, 14, and 16 may be carried out in a computer system or other data processing system in response to its processor, such as a microprocessor, executing sequences of instructions contained in a memory, such as storage device 1707, volatile memory 1705, non-volatile memory 1706, cache 1704 or a remote storage device. In various embodiments, hardwired circuitry may be used in combination with software instructions to implement the disclosed embodiments. Thus, the techniques are not limited to any specific combination of hardware circuitry and software or to any particular source for the instructions executed by the data processing system. In addition, throughout this description, various functions and operations are described as being performed by or caused by software code to simplify description. However, those skilled in the art will recognize what is meant by such expressions is that the functions result from execution of the code by a processor, such as microprocessor 1703.

A machine readable storage medium can be used to store software and data which when executed by a data processing system causes the system to perform various methods of the disclosed embodiments. This executable software and data may be stored in various places including for example storage device 1707, volatile memory 1705, non-volatile memory 1706 and/or cache 1704 as shown in FIG. 17. Portions of this software and/or data may be stored in any one of these storage devices.

Thus, a machine readable storage medium includes any mechanism that stores any information in a form accessible by a machine (e.g., a computer, network device, personal digital assistant, manufacturing tool, any device with a set of one or more processors, etc.). For example, a machine readable medium includes recordable/non-recordable media (e.g., read only memory (ROM); random access memory (RAM); magnetic disk storage media; optical storage media; flash memory devices; etc.).

The detailed description of embodiments of the invention makes reference to the accompanying drawings in which like references indicate similar elements, showing by way of illustration specific embodiments of practicing the invention. Description of these embodiments is in sufficient detail to enable those skilled in the art to practice the invention. One skilled in the art understands that other embodiments may be utilized and that logical, mechanical, electrical, functional and other changes may be made without departing from the scope of the present invention. The detailed description is, therefore, not to be taken in a limiting sense, and the scope of the present invention is defined by the appended claims.

References within the specification to "one embodiment" or "an embodiment" are intended to indicate that a particular feature, structure, or characteristic described in connection with the embodiment is included in at least one embodiment of the present invention. The appearance of the phrase "in one embodiment" in various places within the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Some portions of the detailed description were presented as procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is conceived to be a self-consistent sequence of steps or instructions leading to a desired result. The steps are those requiring physical manipulations of physical quantities. Usually, though not necessarily, these quantities take the form of electrical or magnetic signals of a computer readable storage medium and are capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "sending" or "receiving" or "displaying" or "calculating" or "determining" or "multiplying" or "computing" or "identifying" or the like, refer to the action and processes of a computer system, or similar electronic computing device that manipulates and transforms data represented as physical (electronic) quantities within the computer system's registers and memories and other computer readable media into other data similarly represented as physical quantities within the computer system's memories or registers or other such information storage, transmission or display devices.

In the foregoing specification, the disclosed embodiments have been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

We claim:

1. A method of performing clock network synthesis upon receipt of a non-transitory computer readable circuit design, the method comprising:
   by using a computing device, building a graph representation for a clock network;
   determining an optimal clock network balancing solution for the clock network by applying linear programming to the graph, the applying linear programming comprising generating a set of constraints for the graph and determining a proper insertion delay for each edge of the graph by solving for a minimal skew based on the set of constraints, the set of constraints comprising a plurality of Edge Relation, Endpoint Constraint, Skew Limit, Maximum Latency Constraint and Maximum Skew Constraint; and
   implementing the optimal clock network balancing solution, wherein the implemented optimal clock network balancing solution is used to create an integrated circuit.

2. The method of claim 1, wherein the circuit design is a multimode circuit design, wherein the multimode circuit design comprises a plurality of modes that include at least two modes of working mode, testing mode, hibernating mode, and resetting mode.

3. The method of claim 1 further comprising determining whether the optimal clock network balancing solution satisfies a set of thresholds, wherein the optimal clock network balancing solution is implemented when the optimal clock network balancing solution satisfies the set of thresholds.

4. The method of claim 1, wherein
   the determining the proper insertion delay is implemented as an ALAP schedule.

5. The method of claim 4, wherein the applying of the linear programming further comprises:
   eliminating all target arrival time variables at the clock endpoints; and
   defining a variable for each clock endpoint driver to represent a target arrival time for all the eliminated clock endpoints driven by the clock endpoint driver.

6. The method of claim 1, wherein the circuit design is a multi-corner circuit design, wherein the applying of the linear programming comprises:
   identifying cell and wire delay scaling factors between different corners;
   generating a set of multi-corner constraints based on the identified cell and wire delay scaling factors; and
   determining a proper insertion delay for each edge of the graph based on the set of multi-corner constraints.

7. The method of claim 6, wherein the identifying of the cell and wire delay scaling factors comprises:
   calculating accumulated cell and wire delays for each buffer chain at each corner;
   for each buffer chain, calculating cell and wire delay scaling factors for a corner with respect to a reference corner based on the accumulated cell and wire delays on the buffer chain at the corner and the reference corner; and
   sorting the calculated cell and wire delay scaling factors for all buffer chains at the corner and the reference corner to identify lower and upper bounds of the cell and wire delay scaling factors.

8. The method of claim 1, wherein the circuit design is a multi-domain circuit design, wherein the applying of the linear programming comprises:
   identifying cell and wire delay scaling factors between different corners;
   identifying maximum cell and wire delays for each domain and each corner;
   generating a set of multi-domain constraints based on the identified (i) cell and wire delay scaling factors and (ii) maximum cell and wire delays for each domain and each corner; and
   determining a proper insertion delay for each edge of the graph based on the set of multi-domain constraints.

9. The method of claim 1, wherein the circuit design is a multi-corner circuit design, wherein the implementing of the optimal clock network balancing solution comprises:
   receiving a multi-corner delay target and a plurality of different delay buffers, wherein the different delay buffers have different types, sizes and wire lengths;
   solving a linear programming problem to determine an optimal buffering configuration for achieving the delay target; and
   implementing the optimal buffering configuration.

10. A system comprising:
    a processor;
    a tracer to build a graph representation for a clock network upon receipt of a circuit design;

a constraint generator to generate a set of constraints for the graph, the set of constraints comprising a plurality of Edge Relation, Endpoint Constraint, Skew Limit, Maximum Latency Constraint and Maximum Skew Constraint; and a solver to determine a proper insertion delay for each edge of the graph based on the set of constraints, wherein the solver uses linear programming to determine the proper insertion delays.

11. The system of claim 10, wherein the circuit design is a multimode, multi-corner, and multi-domain circuit design, wherein the set of constraints is generated to determine an optimal solution for the multimode, multi-corner, and multi-domain circuit design.

12. The system of claim 10 further comprising a characterizer to identify different corners and different domains in the circuit design.

13. The system of claim 10 further comprising buffer estimator to identify an optimal buffering configuration for each target delay vector.

14. A computer program product stored as program code on a non-transitory computer-readable medium, the program code executable by at least one processor for performing clock network synthesis upon receipt of a non-transitory computer readable circuit design, the computer program product comprising a computer readable program code comprising instructions for:

building a graph representation for a clock network;

determining an optimal clock network synthesis solution for the circuit design by applying a plurality of linear programming to the graph, the applying linear programming comprising generating a set of constraints for the graph and determining a proper insertion delay for each edge of the graph by solving for a minimal skew based on the set of constraints, the set of constraints comprising a plurality of Edge Relation, Endpoint Constraint, Skew Limit, Maximum Latency Constraint and Maximum Skew Constraint; and implementing the optimal clock network synthesis solution, wherein the implemented optimal clock network synthesis solution is used in the creation of an integrated circuit.

15. The computer program product of claim 14, wherein the instructions for determining a proper insertion delay is implemented as an ALAP schedule.

16. The computer program product of claim 14, wherein the instructions for determining the optimal clock network synthesis solution further comprises instructions for:

generating a first set of constraints for the graph;

determining a first minimal skew by solving a first linear programming problem based on the first set of constraints;

generating a second set of constraints that includes the determined first minimal skew;

determining a minimal latency by solving a second linear programming problem based on the second set of constraints;

generating a third set of constraints that includes the determined minimal latency; and determining a second minimal skew by solving a third linear programming problem based on the third set of constraints.

17. The computer program product of claim 14, wherein the instructions for determining the optimal clock network synthesis solution comprises instructions for:

generating a first set of constraints for the graph;

determining a best achievable target constraint by solving a first linear programming problem based on the first set of constraints;

receiving a target constraint;

generating a second set of constraints that includes the received target constraint; and solving a second linear programming problem based on the second set of constraints.

18. The computer program product of claim 17, wherein the instruction for determining the optimal clock network synthesis solution further comprises instructions for displaying the best achievable target constraint to a user, wherein the target constraint is received from the user after the best achievable target constraint is displayed to the user.

19. The computer program product of claim 17, wherein the receiving the target constraint comprises determining the target constraint automatically based on the best achievable target constraint.

20. The computer program product of claim 17, wherein the best achievable target constraint is a minimal achievable skew and the received target constraint is a skew target.

21. The computer program product of claim 20, wherein the optimal clock network synthesis solution optimizes skew, insertion delay, and clock area at the same time.

22. The computer program product of claim 14, wherein the computer readable program code further comprises instructions for determining whether the optimal clock network synthesis solution satisfies a set of thresholds, wherein the optimal clock network synthesis solution is implemented when the optimal clock network synthesis solution satisfies the set of thresholds.

* * * * *